(12) United States Patent
Yun et al.

(10) Patent No.: US 10,579,137 B2
(45) Date of Patent: Mar. 3, 2020

(54) METHOD FOR CONTROLLING IMAGE DISPLAY AND APPARATUS SUPPORTING SAME

(71) Applicant: SAMSUNG ELECTRONICS CO., LTD., Suwon-si, Gyeonggi-do (KR)

(72) Inventors: Yongsang Yun, Osan-si (KR); Chihyun Cho, Suwon-si (KR); Jongchul Choi, Suwon-si (KR); Changryong Heo, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 67 days.

(21) Appl. No.: 14/948,909

(22) Filed: Nov. 23, 2015

(65) Prior Publication Data

US 2016/0147296 A1 May 26, 2016

(30) Foreign Application Priority Data

Nov. 21, 2014 (KR) .................. 10-2014-0163389

(51) Int. Cl.
| | |
|---|---|
| *G06F 3/01* | (2006.01) |
| *G06T 3/40* | (2006.01) |
| *G02B 27/01* | (2006.01) |
| *G02B 27/00* | (2006.01) |

(52) U.S. Cl.
CPC ........... *G06F 3/012* (2013.01); *G02B 27/017* (2013.01); *G06F 3/017* (2013.01); *G06T 3/40* (2013.01); *G02B 27/0093* (2013.01); *G02B 2027/014* (2013.01); *G02B 2027/0187* (2013.01)

(58) Field of Classification Search
None
See application file for complete search history.

(56) References Cited

U.S. PATENT DOCUMENTS

| | | | |
|---|---|---|---|
| 5,917,460 A | 6/1999 | Kodama | |
| 6,084,556 A | 7/2000 | Zwern | |
| 6,184,847 B1 | 2/2001 | Fateh et al. | |

(Continued)

FOREIGN PATENT DOCUMENTS

| | | |
|---|---|---|
| JP | 2002-532919 | 10/2002 |
| KR | 10-2009-0094042 | 9/2009 |
| KR | 10-2012-0101878 | 9/2012 |

OTHER PUBLICATIONS

International Search Report dated Mar. 10, 2016 in counterpart International Patent Application No. PCT/KR2015/012602.

(Continued)

*Primary Examiner* — Christopher R Lamb
(74) *Attorney, Agent, or Firm* — Nixon & Vanderhye P.C.

(57) ABSTRACT

The disclosure relates to a method of controlling an image display by an electronic device and an apparatus thereof. A method for controlling an image display by an electronic device according to various examples includes: displaying an image; checking a display state of the image; detecting a movement of the electronic device; when the movement of the electronic device is detected, determining a movement variance based on the movement, adjusting a display portion variance based on the display state and the movement variance; and displaying an image having the changed display portion based on the display portion variance.

18 Claims, 34 Drawing Sheets

(56) References Cited

U.S. PATENT DOCUMENTS

| | | | |
|---|---|---|---|
| 6,215,461 B1 * | 4/2001 | Ishibashi | G02B 27/017 345/8 |
| 6,359,603 B1 | 3/2002 | Zwern | |
| 7,224,326 B2 | 5/2007 | Sefton | |
| 8,549,415 B2 | 10/2013 | Tang | |
| 8,866,702 B1 | 10/2014 | Wong et al. | |
| 9,213,403 B1 * | 12/2015 | Raffle | G06F 3/011 |
| 2001/0043165 A1 | 11/2001 | Stanton | |
| 2003/0025651 A1 | 2/2003 | Susnjara et al. | |
| 2011/0043436 A1 | 2/2011 | Yamamoto | |
| 2012/0110501 A1 | 5/2012 | Baek et al. | |
| 2014/0129938 A1 | 5/2014 | Tang | |

OTHER PUBLICATIONS

EP Search Report for EP Application No. 15861327.3 dated Oct. 10, 2017.

* cited by examiner

Display
portion 1

Display portion O

Display
portion 2

Display
portion 0

Display
portion 2

Display Portion OPERATION 1 θ 2

METHOD FOR CONTROLLING IMAGE DISPLAY AND APPARATUS SUPPORTING SAME

CROSS-REFERENCE TO RELATED APPLICATION

This application is based on and claims priority under 35 U.S.C. § 119 to Korean Patent Application No. 10-2014-0163389, filed in the Korean Intellectual Property Office on Nov. 21, 2014, the disclosure of which is incorporated by reference herein in its entirety.

BACKGROUND

1. Field

The disclosure relates to a method for controlling an image display and an apparatus supporting the same.

2. Description of Prior Art

In recent years, electronic devices have been developed to become a wearable device that can be worn on the body. The wearable device may include a device, such as a wristwatch, a bracelet, which is attached to the arm, eye glasses, or a Head Mounted Display (HMD) that can be worn on the head of a user. In particular, the head-mounted display device is worn on the user's face and provides a function that displays images directly in front of the user's eyes. In addition, the head mounted display device can provide a realistic virtual space through which the screen moves together in accordance with the user's movement.

SUMMARY

A portion of display images may be enlarged in order to check the display images in detail and broadly. In response thereto, the head-mounted display device can provide enlarged images. Further, the head-mounted display device can detect the user's movement in a state where an enlarged image is displayed. In this case, there is a problem of inducing dizziness to the users due to the large variation in the image displayed on the display.

An electronic device according to an example of the disclosure may provide, when detecting a movement in a state of having an enlarged image displayed in a virtual space, a method and apparatus that controls the display device to display an image in which the display portion variance is adjusted.

According to an example of the disclosure, a method for controlling an image display of an electronic device is provided, the method including: displaying an image; checking a display state of the image; detecting a movement of the electronic device; when the movement of the electronic device is detected, determining a movement variance based on the movement; adjusting a display portion variance based on the display state and the movement variance; and displaying an image having the changed display portion based on the display portion variance.

According to an example of the disclosure, an electronic device is provided. The electronic device may include: a display unit including a display that displays an image; a sensor unit including a sensor that detects a movement of the electronic device; and a controller configured to check the display state of the displayed image, when movement of the electronic device is detected, to determine a movement variance, to adjust a display portion variance based on the display state and the movement variance, and to control the display unit to display an image having the changed display portion according to the display portion variance.

According to an example of the disclosure, provided is a computer-readable recording medium in which a program for executing a method for controlling an image display by an electronic device is recorded. The method may include: displaying an image; checking a display state of the image; detecting a movement of the electronic device; when the movement of the electronic device is detected, determining a movement variance based on the movement; adjusting a display portion variance based on the display state and the movement variance; and displaying an image where the display portion has been changed based on the display portion variance.

The electronic device according to an example of the disclosure may display the image by appropriately adjusting the display portion variance based on the display state of the image and the movement variance. Therefore, the user can see the image reducing a feeling of, or without feeling dizziness. In addition, the electronic device may display the image by adjusting the display portion variance and thus provide an image having continuity to the user.

BRIEF DESCRIPTION OF THE DRAWINGS

The above and other features and advantages of the disclosure will be more apparent from the following detailed description, taken in conjunction with the accompanying drawings, in which like reference numerals refer to like elements, and wherein.

DETAILED DESCRIPTION

Figure 1:
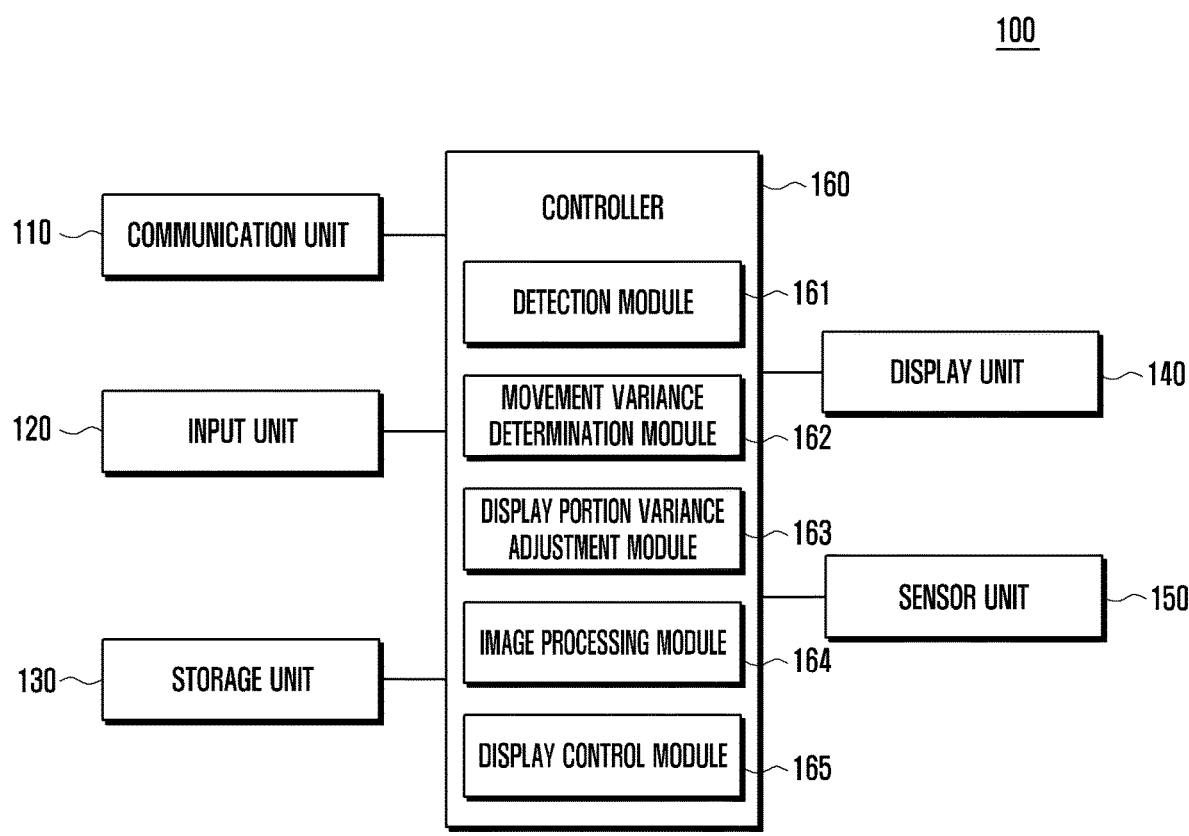
FIG. 1 is a block diagram illustrating an example configuration of an electronic device.

Hereinafter, example embodiments of the disclosure will be described in detail with reference to the accompanying drawings. It should be noted that the same elements will be designated by the same reference numerals although they are illustrated in different drawings. Further, descriptions related to well-known functions or configurations capable of making subject matters of the disclosure unnecessarily obscure will be omitted.

Meanwhile, example embodiments of the disclosure illustrated and described in this specification and the drawings correspond to specific examples presented in order to explain technical contents of the disclosure, and to aid in comprehension of the disclosure, but are not intended to limit the scope of the disclosure. It will be apparent to those having ordinary knowledge in the technical field, to which the disclosure pertains, that it is possible to practice other modified embodiments based on the technical idea of the disclosure as well as the examples disclosed herein.

For example, the electronic device may include at least one of a smart phone, a tablet Personal Computer (PC), a mobile phone, a video phone, an e-book reader, a desktop PC, a laptop PC, a netbook computer, a PDA, a Portable Multimedia Player (PMP), an MP3 player, a mobile medical device, a camera, a wearable device (for example, a Head-Mounted-Device (HMD) such as electronic glasses, electronic clothes, an electronic bracelet, an electronic necklace, an electronic appcessory, an electronic tattoo, a smart watch, or the like.

In an example of the disclosure, an electronic device may, for example, be a Head-Mounted Display (hereinafter, HMD) device. However, the electronic device is not limited to thereto, and is applicable to any electronic device capable of representing images including coordinate information based on position and/or space.

In an example of the disclosure, the HMD device may be worn on a user's head. The HMD device may be a See-closed type where an outside image is not transmitted to the user's eyes. The HMD device can be provided with a structure for attaching to the user's head, and the interior of the structure thereof may be provided with a device for controlling the operation of the HMD device. The HMD device may include an optical system and an adjusting device between the user's eyes and the display device. The display device can be configured to be detachably attached to the HMD device. The HMD device can separate and output a single image into two images so as to be seen through the user's eyes. The HMD device may be provided with a device for outputting a light source that can be used to display an image. The HMD device may transmit, to a waveguide and a lens, the light source output from the HMD device, and provide the image to the user.

In an example of the disclosure, the user's viewpoint is an image of an area corresponding to the direction of the user's view in a virtual space. The HMD device may configure the image of the area that corresponds to the user's viewpoint as a display portion. The display portion includes an image, which is displayed on the display of the HMD device, among the overall image. When detecting the user's movement, the HMD device may change the user's viewpoint in the detected movement direction. The HMD device may also change the display portion based on the changed user's viewpoint and then display a corresponding image.

In an example of the disclosure, when the HMD device detects the movement and displays the image having magnification applied thereto, a display portion variance may correspond to a value for adjusting the display portion to be displayed. The HMD device may display, when detecting a movement in a state where the enlarged image is displayed, the display portion which has moved less than the movement by adjusting the display portion variance.

FIG. 1 is a block diagram illustrating an example configuration of an electronic device.

Referring to FIG. 1, an electronic device 100 may include a communication unit including, for example, communication circuitry 110, an input unit including, for example, input circuitry 120, a storage unit including, for example, a memory 130, a display unit including, for example, a display 140, a sensor unit including, for example, a sensor 150 and a controller 160. The electronic device, which will be described below, is described with reference to a head-mounted display (HMD) device 100.

The communication unit includes communication circuitry 110 and may use a cellular communication protocol, for example, at least one of LTE, LTE-A, CDMA, WCDMA, UMTS, WiBro, GSM, or the like. The communication unit 110 may also include circuitry for wired communication. The wired communication may include, for example, at least one of a Universal Serial Bus (USB), a High Definition Multimedia Interface (HDMI), Recommended Standard 232 (RS-232), and a Plain Old Telephone Service (POTS).

The communication unit 110 may, for example, include a cellular module, a WiFi module, a BT module, a GPS module, a NFC module and Radio Frequency (RF) module.

The cellular module may, for example, provide a voice call, a video call, text message services, or Internet services through, for example, a communication network. According to an example, the cellular module can perform distinction and authentication of electronic devices in a communication network, using a Subscriber Identity Module (e.g., a SIM card). According to an example, the cellular module may perform at least some of the functions that can be provided by an Application Processor (AP). According to an example, the cellular module may include a Communication Processor (CP).

Each of the Wi-Fi module, the BT module, the GPS module, and the NFC module may include, for example, a processor for processing data transmitted/received through the corresponding module. According to an example, at least a part (e.g., two or more) of the cellular module, the Wi-Fi module, the BT module, the GPS module, or the NFC module may be included in one Integrated Chip (IC) or in an IC package.

The RF module may transmit/receive, for example, a communication signal (e.g., a RF signal). The RF module may include, for example, a transceiver, a Power Amp Module (PAM), a frequency filter, a Low Noise Amplifier (LNA) or an antenna. According to another embodiment, at least one among the cellular module, the WIFI module, the BT module, the GPS module, or the NFC module may transmit/receive the RF signal through a separate RF module.

For example, the communication unit 110 in an example of the disclosure may be connected to and communicate with an external electronic device under a control of a controller 160. For example, the communication unit 110 may request the external electronic device for the image to be displayed on the display unit 140. The communication unit 110 may receive the image from the external electronic device in response to the request.

The input unit 120 may generate a signal related to the function control of the HMD device 100 and transmit the signal to the controller 160. The input circuitry of the input unit 120 may include at least one of a physical key, a physical button, an optical key-touch key, a joystick, a wheel key or a touch pad. The touch pad may recognize a touch input based on at least one scheme among, for example, a capacitive scheme, a resistive scheme, an infrared scheme, and an ultrasonic scheme. The touch pad may include a control circuit. For the touch pad of the capacitive scheme, proximity recognition may also be possible in addition to a physical contact touch. The touch pad may further include a tactile layer. In this case, the touch pad may provide a user with a tactile reaction.

For example, in an example of the disclosure, the input unit 120 may include a mouse, a touch input device, additional accessories, and the like, in order to configure the image. The additional accessories may, for example, include pen accessories. The input unit 120 may change an output image in accordance with up, down, left and right movements under the control of the controller 160. The input unit 120 may configure the output range of the image, and transmit the configured output range information to the controller 160.

A storage unit 130 may, for example, include a program memory for storing an operation program of the HMD device 100 and a data memory for storing data generated during the execution of the program. For example, the storage unit 130 may include an internal memory or an external memory. The embedded memory may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash or a NOR flash), a hard disk drive, a Solid State Drive (SSD), or the like. The external memory may further include a flash drive, for example, a Compact Flash (CF), a Secure Digital (SD), a Micro Secure Digital (Micro-SD), a Mini Secure Digital (Mini-SD), an extreme Digital (xD), or a memory stick. The external memory can be functionally and/or physically connected to the HMD device through various interfaces.

For example, the storage unit 130 in an example of the disclosure may store images to be provided to the user. The storage unit 130 may store the image received from the external electronic device. In addition, the storage unit 130 may store the image processed through image processing (for example, image correction, image distortion) in order to output the image to the display unit 140 under the control of the controller 160.

The display unit 140 may display various screens according to the usage of the HMD device 100 under the control of the controller 160. In addition, the display unit 140 may, for example, include a Liquid Crystal Display (LCD), an Organic Light Emitted Diode (OLED), an Active Matrix Organic Light Emitted Diode (AMOLED), a flexible display, a bended display, or a 3D display. Furthermore, the display unit may be implemented to be flexible, transparent, or wearable.

For example, in an example of the disclosure, the display unit 140 may display the image under the control of the controller 160. The image may include an image stored in the storage unit 130 or received from the external electronic device connected through the communication unit 110. The display unit 140 may display, when detecting a display state change event under the control of the controller 160, an image where the display state has been changed. The display unit 140 may display, when detecting a movement under control of the controller 160, an image where the display portion variance is adjusted on the basis of the display state and the movement.

In addition, the display unit 140 may perform the function of displaying the display data close to the user's eyes. The display unit 140 is either fixed inside the HMD device 100 or detachably attached thereto. For example, when the display unit 140 may correspond to the external device (e.g., a display device or an electronic device), the display unit 140 is detachably attached thereto. Although not shown in the drawings, when the display unit 140 is detachably attached to the HMD device 100, the HMD device 100 may include a lens assembly between the external device and the user's eyes, and a connector capable of connecting the external device and the HMD device 100. The external device and the HMD device 100 may provide a signal of the user interface to the external device through the connector.

The sensor module 150 may, for example, include at least one sensor, and may measure a physical quantity or detect an operation state of the HMD device 100, and may convert the measured or detected information to an electrical signal. The sensor unit 150 may include, for example, at least one among a gesture sensor, a gyro sensor, a barometric air pressure sensor, a magnetic sensor, an acceleration sensor, a grip sensor, a proximity sensor, a color sensor (e.g. RGB (red, green, blue) sensor), a biological sensor, a temperature/humidity sensor, an illuminance sensor, or an Ultra Violet (UV) sensor. Additionally or alternatively, the sensor module 150 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor, or the like. The sensor unit 150 may further include a control circuit configured to control at least one sensor included therein. In some examples, the HMD device 100 may further include a processor configured to control the sensor unit 150, as a part of the AP or individually, and may be configured to control the sensor unit 150 when the AP is in a sleep state.

For example, in an example of the disclosure, the sensor unit 150 may collect the sensing information based on the change in the state of the HMD device 100 and transmit to the controller 160. The sensor unit 150 may detect the movement of the user's head wearing the HMD device 100 by using at least one among the acceleration sensor, the gyro sensor, the geomagnetic sensor. The sensor unit 150 may detect whether the HMD device 100 is worn or not by detecting at least one among IR recognition, pressurized recognition, and capacitance (or dielectric constant) variance. The gesture sensor may detect the movement of a user's hand or finger and detect the control input of the HMD device 100. The sensor unit 150 may recognize the user's biometric information by using the biometric sensor. For example, the sensor unit 150 may recognize the eye region of the user wearing the HMD device 100 and detect the movement of the eye.

The controller 160 may be configured to decrypt the function execution commands of the constitutional elements of the HMD device 100, and to execute operations and data processing based on the decrypted command. For example, the controller 160 may be configured to control multiple hardware components connected to the controller 160 by driving an operating system (OS) or an embedded S/W program. The controller 160 may, for example, include at least one processor.

The controller 160 may be configured to process the display data based on the characteristics of the HMD device 100 and to control the device to output the processed display data to the display unit 140.

For example, in an example of the disclosure, the controller 160 may include a detection module including detection circuitry 161, a movement variance determination module including circuitry configured to determine a movement variance 162, a display portion variance adjustment module including circuitry configured to adjust a display portion 163, an image processing module including image processing circuitry 164, and a display control module or processor 165.

The controller 160 may be configured to display an image stored in the storage unit 130 and/or an image received from the external electronic device connected through the communication unit 110.

The detection module 161 may, for example, be configured to check the display state of the displayed image. In addition, the detection module 161 may be configured to detect a display state change event in a state where the image is displayed. The detection module 161 may, for example, be configured to check, when the display state change event is detected, the image information where the display state has been changed. For example, the display state of the image may include information on whether to apply magnification or reduction of the image and magnification or reduction information. In addition, the detection module 161 may be configured to transmit the display state information (for example, magnification and/or reduction information) to the display portion variance adjustment module 163. The detection module 161 may be configured to detect, in a display state of the image where the display state has been changed, the movement of the HMD device 100 through the sensor unit 150. The detection module 161 may be configured to detect the movement of the HMD device 100 in at least one direction of up, down, left and right directions.

The movement variance determination module 162, when detecting the movement of the HMD device 100 through the detection module 161, may, for example, determine the movement variance based on the movement. The movement variance determination module 162 may be configured to transmit the determined movement variance information to the display portion adjustment module 163.

The display portion variance adjustment module 163 may be configured to adjust the display portion variance based on the display state information received from the detection module 161 and the movement variance received from the movement variance determination module 162.

The image processing module 164 may be configured to correct an image based on the display portion variance adjusted through the display portion variance adjustment module 163. For example, when detecting a movement through the detection module 161 from the user's viewpoint of the initial configuration state, the image processing module 164 may be configured to correct the image so as to display an image where the user's viewpoint has been changed based on the movement. The HMD device 100 may refract, when a larger size image is provided as the device is located within a shorter distance in front of the user's eyes, the light from the optical device to transmit the light to the user's eyes. The image processing module 164 may be configured to display the image after correcting the image to match the focus of the user's eyes. The image may be configured as a two-dimensional image which is output to the display unit 140. The image processing module 164 may be configured to warp the two-dimensional image. Warping may, for example, include a method of changing the pixel information of the image which is displayed on the display unit 140. The image processing module 164 may be configured to change the information displayed as a straight line in the image to a curve (that is, the distortion of the image) by warping the image. For example, the image processing module 164 may be configured to display the display portion as a bending curved form instead of displaying the display portion as the rectangular shape. The image processing module 164 may be configured to pass the distorted images through the lens and transmit the same image as an image before being distorted to the display control module 165. In addition, when providing an image to both eyes, the image processing module 164 may be configured to distort (e.g., warp) the image in order to match the user's focus.

The display control module 165 may be configured to display, on the display unit 140, the corrected image received from the image processing module 164. The image may include a display portion which appears at a particular time. The image may be a sphere space-shaped image. The display control module 165 may display an image after changing the image being provided in the display portion based on head-tracking.

FIGS. 2A to 2H are diagrams illustrating an example method of controlling an image display by an electronic device.

Referring to FIG. 2A to FIG. 2H, the electronic device may, for example, be an HMD device. In an example of the disclosure, the HMD device 100 may display an image. The image may include information on multiple viewpoints. The image may have information on left and right directions (X-axis direction, 0~360°) and up and down directions (Y-axis direction, −90~90°). The HMD device 100 may provide, for example, to the user, through the display unit 140, a spatial display data, that may include, for example, an image including information on the X-axis and/or Y-axis direction. When detecting the movement through the sensor unit 150, the HMD device 100 may determine the movement variance corresponding to the movement. The HMD device 100 may display the display portion which is moved based on the movement variance. That is, the HMD 100 may determine the user Field Of View (FOV), which is detected based on head tracking of the user, as the display portion, and display the FOV on the display unit 140.

Figure 2A:
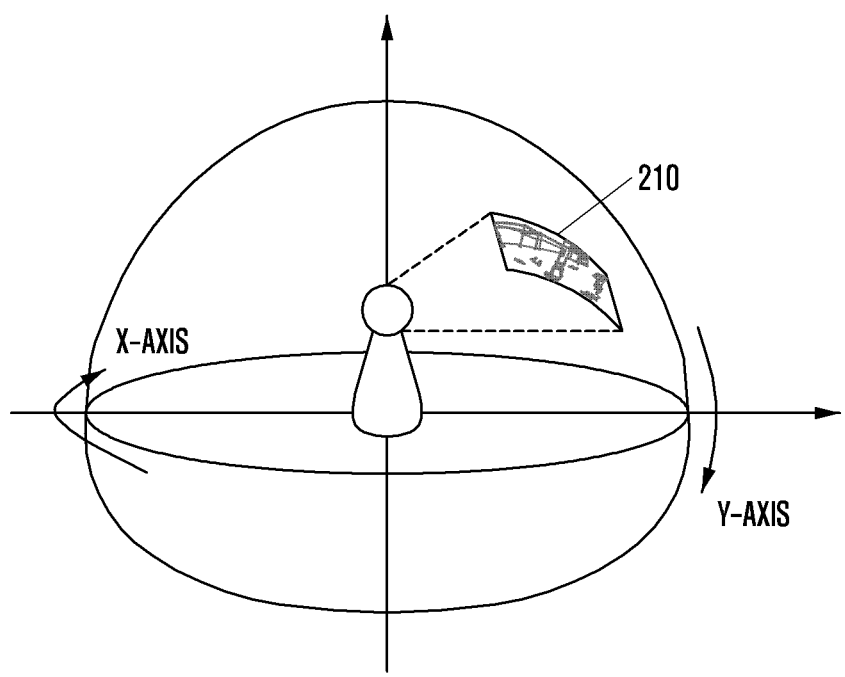
FIGS. 2A-2H are diagrams illustrating an example method of controlling an image display by an electronic device.
Figure 2B:
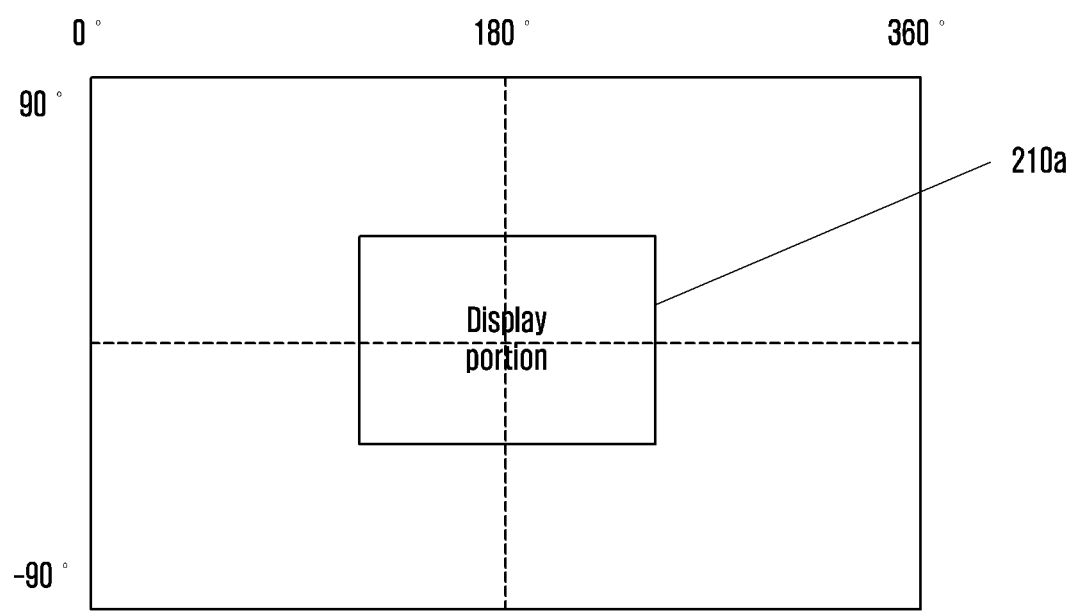

As illustrated in FIG. 2A, in the form of the user looking at '210', HMD device 100 may determine 210 as the user's field of view. For example, the user's field of view 210 may be a display portion in the initial configuration state. The initial configuration state may be a reference value for the display state change and the movement. As illustrated in 210a in FIG. 2B, the HMD device 100 may output, to the display unit 140, the display portion corresponding to the user's field of view 210.

The HMD device 100 may correct the image to output the display portion to the display unit 140. For example, the HMD device 100 may warp the image, for example, image distortion may occur. When detecting the motion through the sensor unit 150, the HMD device 100 may display the display portion that corresponds to the motion. For example, the HMD device 100 may configure, when detecting the movement by which a user's field of view moves at 30° along the X-axis, the display portion by reflecting the movement 30° moved correspondingly thereto. The display portion is shown as a square shape, but it is not limited thereto, and can be configured in various shapes.

Figure 2C:
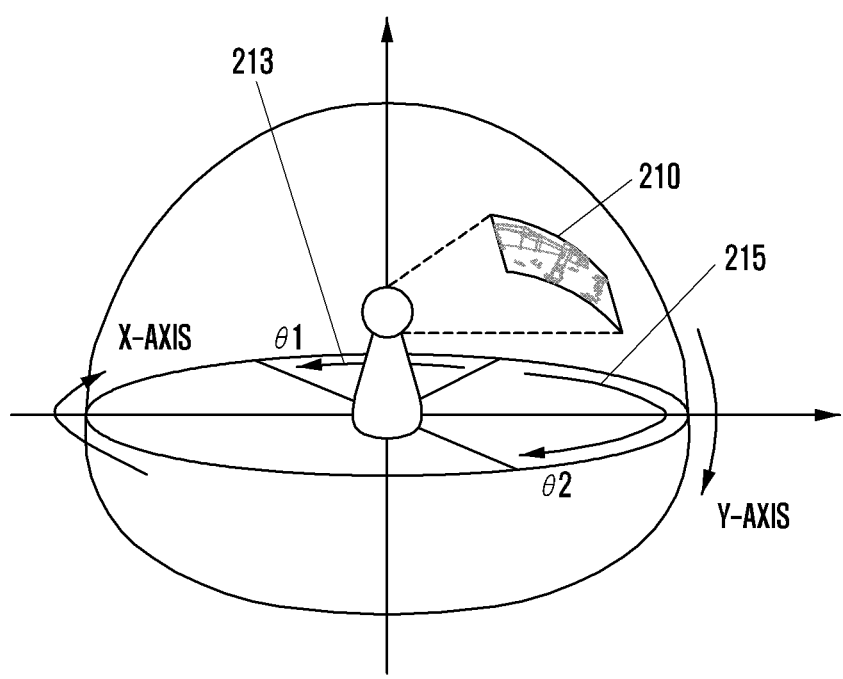
Figure 2D:
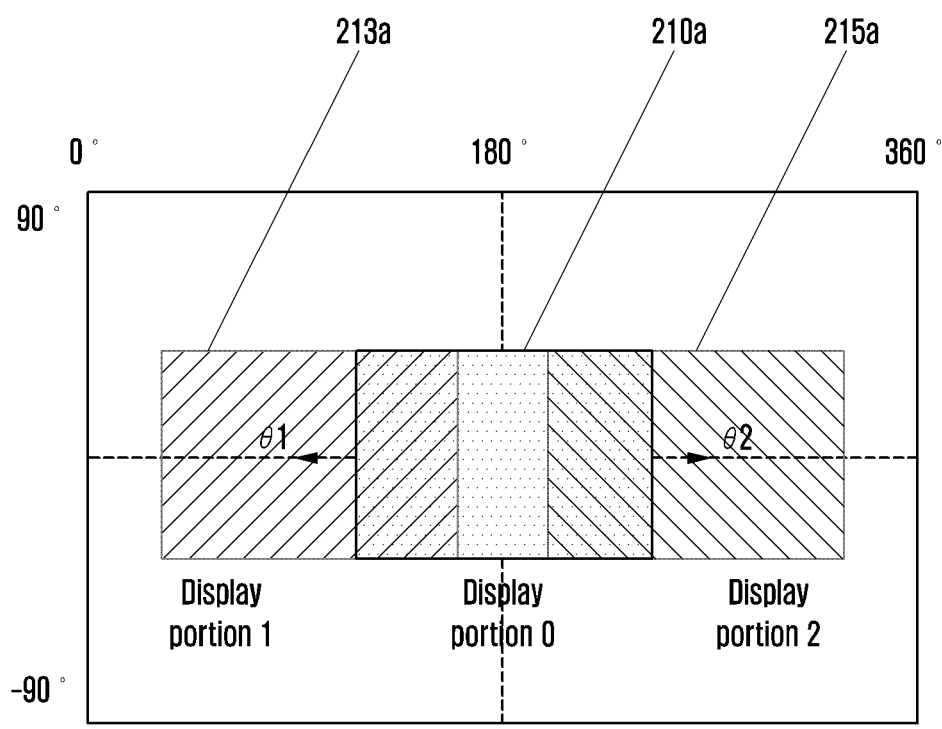

As illustrated in FIG. 2C and FIG. 2D, the display portion 210 in the initial configuration state, the user's field of view may be configured as the display portion 0 210a such that the center of the x-coordinate in FIG. 2D faces to 180 degrees. The HMD device 100 may detect the user's movement or the movement of the HMD device 100 through the sensor unit 150. The HMD device 100 may analyze the movement to check the user's field of view movement direction. The HMD device 100 may detect the movement in the opposite direction along the X-axis by θ1, as indicated by '213'. The HMD device 100 may display the display portion which has been changed based on the movement. The HMD device 100 may display, when detecting the movement in the opposite direction along the X-axis (i.e., the left direction) by θ1 213, the movement as a display portion 1 changed from the display portion 0 210a, as indicated by 213a of FIG. 2D. On the other hand, the HMD device 100 may display, when detecting the movement along the X-axis direction (i.e., the right direction) by θ2, as indicated by 215, the movement as a display portion 2 changed from the display portion 0 210a, as indicated by 215a of FIG. 2D. The display portion may be displayed in proportion to the movement variance corresponding to the motion detected through the sensor unit 150 of the HMD device 100. For example, the HMD device 100 may display the display portion on the display unit 140, in which the display portion (e.g., the direction where the user actually views in a state where the user is wearing the HMD 100) that corresponds to the user's field of view has been changed based on the movement variance.

Figure 2E:
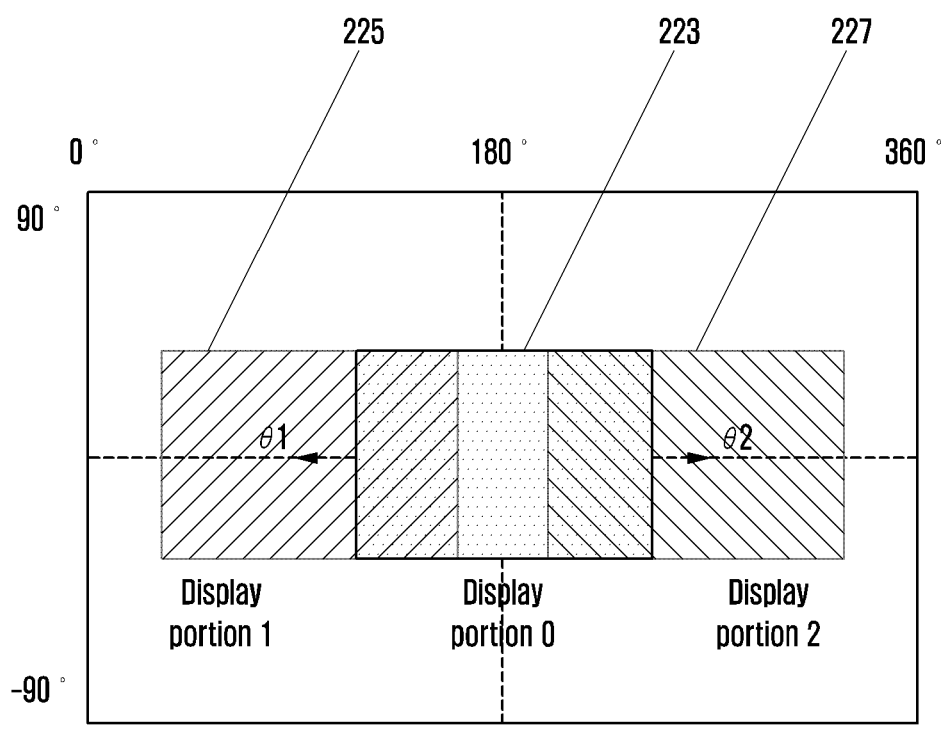
Figure 2F:
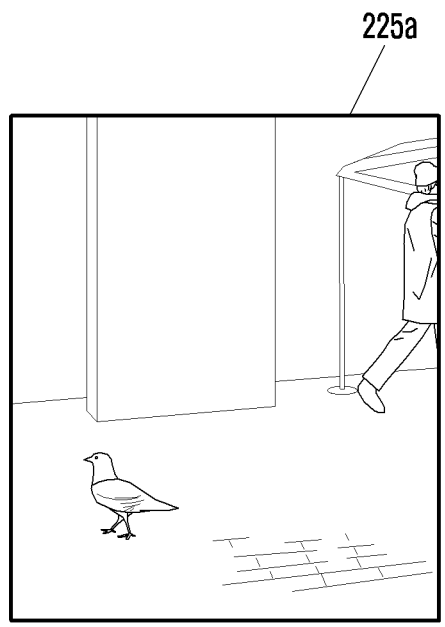
Figure 2G:
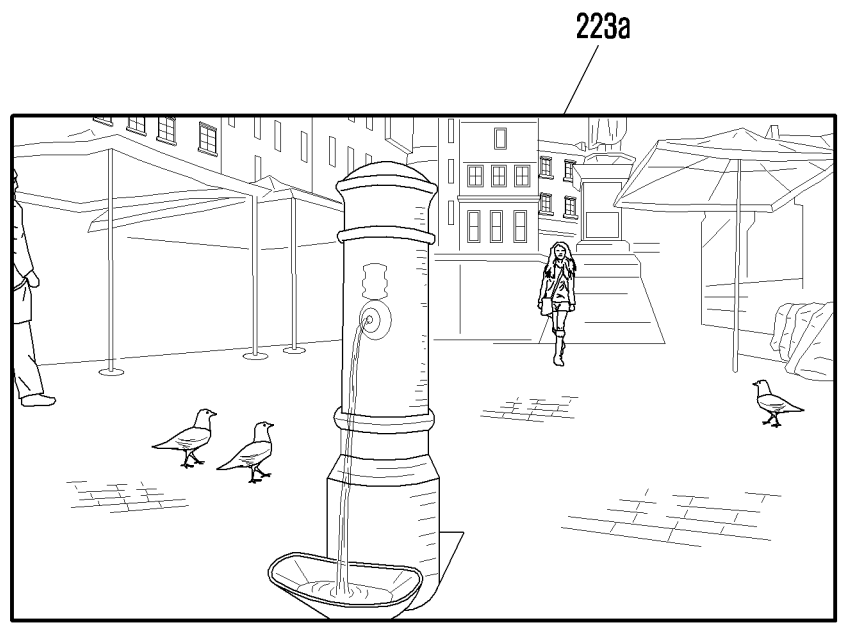
Figure 2H:

As another example of the disclosure, with reference to FIG. 2E to FIG. 2H, the HMD device 100 may display the display portion 0 223a in FIG. 2G as the initial configuration state in which the movement is not detected as shown in 223 of FIG. 2E. As shown in 225 of FIG. 2E, when detecting the movement by θ1 in the opposite direction along the X-axis, the HMD 100 may display the display portion 1 as shown in 225a in FIG. 2F. As shown in 227 of FIG. 2E, when detecting the movement by θ2 along the X-axis, the HMD 100 may display a display portion 2 as shown in 227a in FIG. 2H.

Figure 3:
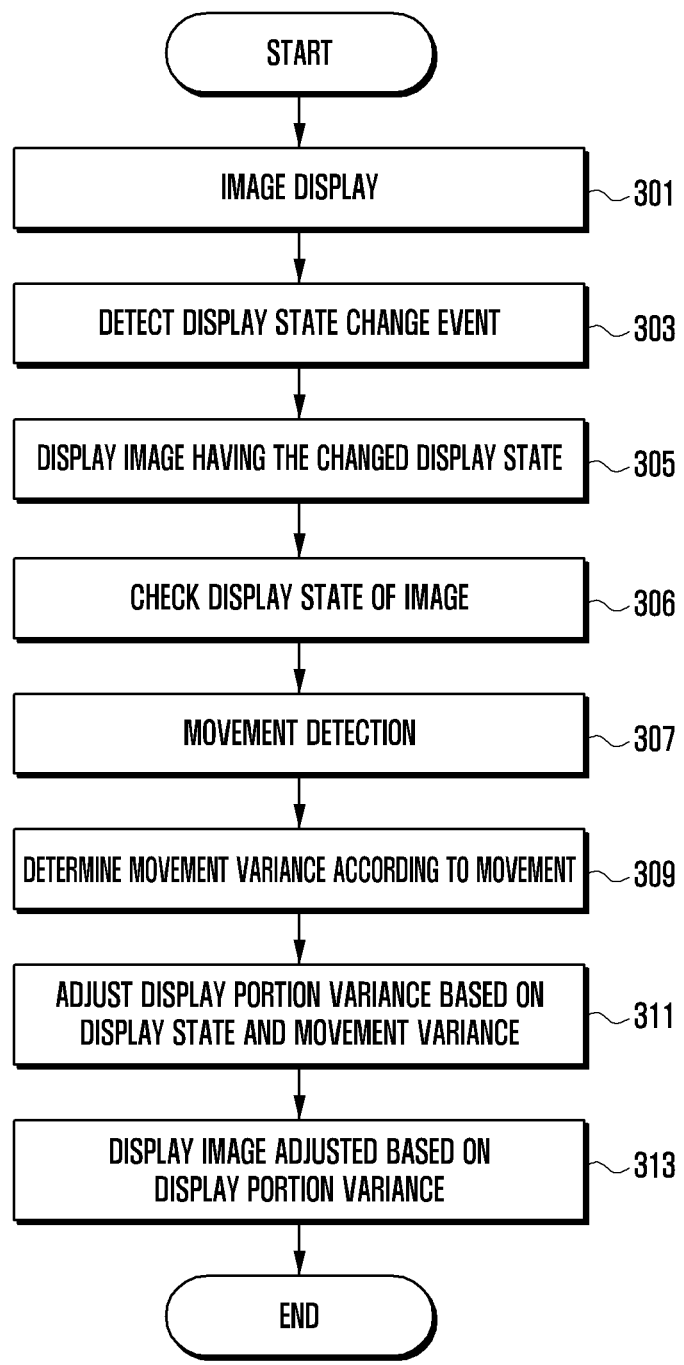
FIG. 3 is a flowchart illustrating an example method of controlling an image display based on a display state change event and a movement of an electronic device.

FIG. 3 is a flowchart illustrating an example method for controlling image display by an electronic device.

Referring to FIG. 3, the HMD device 100 may display an image in operation 301. The HMD device 100 acquires information, for example, on the user's field of view and displays the display portion that corresponds to the user's field of view. Here, the image may be in a state of not being enlarged or reduced and having an initially configured resolution (e.g., a default state). Further, the image may be in a state of maintaining the previous configuration state. For example, the image may be in a state of maintaining the reduced or enlarged state to which the reduced or enlarged state is previously applied. At this time, the state of the image (that is, a default state or a state of maintaining the previous configuration state) may be a reference value for changing the display portion according to the magnification, the reduction, and the movement.

The HMD device 100 may detect a display state change event, in operation 303. According to an example of the disclosure, the display state change event may include a magnification request input or a reduction request input in order to display some portions of the image in enlarged or reduced form.

When the display state change event is detected, the HMD device 100 may display an image in which the display state has been changed, in response to the display state change event, in operation 305. For example, when a magnification request input is detected, the HMD device 100 may display an image having the magnification applied thereto, in response to the magnification request input. On the other hand, when a reduction request input is detected, the HMD device 100 may display an image having reduction applied, in response to the reduction request input. The term "magnification" may, for example, refer to a ratio of enlarging a specific area at a constant magnification, out of the display portion displayed on the display unit 140. The term "reduction" may, for example, refer to a ratio of reducing the display portion displayed on the display unit 140 to be smaller by a constant magnification and further displaying a predetermined area including the display portion.

When displaying the image having the magnification applied thereto, the image having the magnification applied thereto may be in a state of displaying a smaller area compared to the full image. When displaying the image having the reduction applied thereto, the image having the reduction applied thereto may be in a state of displaying a larger area compared to the full image. In addition, through the image having the magnification applied thereto, the user may recognize that the image is located at a close distance. In addition, through the image having reduction applied thereto, the user may recognize that the image is located at a far distance.

According to an example of the disclosure, the HMD device 100 may further perform an operation of analyzing the ratio of the display portion to be displayed on the display unit 140. When the ratio of the image being displayed after having the magnification applied thereto and the full image exceeds a pre-configured threshold, the HMD device 100 may determine the display state of the image as a state of being displayed after reducing the image. In addition, when the ratio of the image being displayed after having the magnification applied thereto and the full image does not exceed a pre-configured threshold, the HMD device 100 may determine the display state of the image as a state of being displayed after magnifying the image.

The HMD device 100 may check the display state of the image, in operation 306. For example, the HMD device 100 may check whether the image is in a magnification state or a reduction state. In addition, the HMD device 100 may check the rate information of the magnification state and the rate information of the reduction state. In addition, the HMD device 100 may check whether the display state of the image is equal to or smaller than the previous configuration value. According to an example of the disclosure, the previous configuration value can be defined as a term of determining whether to perform an operation of adjusting the display portion variance. For example, when the display state of the image is equal to or smaller than the previous configuration value, the HMD device 100 may not perform an operation of adjusting the display portion variance to be described later. Whether to execute the operation of adjusting the display portion variance according to the predetermined configuration value will be described below.

The HMD device 100 may detect the movement of the HMD device 100 through the sensor unit 150, in operation 307. For example, the HMD device 100 may detect the movement of the HMD 100 device in at least one direction among up, down, left, and right directions using at least one of the acceleration sensor, the gyro sensor, and the geomagnetic sensor. When the movement of the HMD device 100 is detected, the HMD device 100 may determine the movement variance based on the movement, in operation 309. For example, the HMD device 100 may determine the movement amount along the X-axis and/or Y-axis direction from the display portion of the initial configuration state.

The HMD device 100 may adjust the display portion variance based on the display state and the movement variance, in operation 311. For the display portion variance, when the movement is detected in a state where the image is enlarged, the variance of the image can be large even if the user makes a little movement. Therefore, an example of the disclosure can display the moved image by a smaller amount than the amount of changes in the image that actually have been moved due to the user movement. The HMD device 100 may display the image where the display portion is adjusted based on the display portion variance, in operation 313.

According to an example of the disclosure, when adjusting the display portion variance, the display portion variance can be variously adjusted, for example, by Equation 1 as follows.

$$\theta 3 = \frac{\theta 2}{\beta} \text{ or, } \theta 3 = 2 * \frac{\theta 2}{\beta} \text{ or, } \theta 3 = \frac{\theta 2}{2\beta}$$ [Equation 1]

($\theta 3$: Display portion variance, $\theta 2$: Movement variance, $\beta$: constant)

According to an example of the disclosure, $\beta$ may be magnification rate. The display portion variance will be described, for example, on the assumption that it is automatically adjusted by the Equation 1 that has already been configured, but it is not limited thereto, and the HMD device 100 may display a popup window for adjusting the display portion variance. For example, the HMD device 100 may display a window for configuring the display portion variance so that the user can adjust the display portion variance.

According to an example of the disclosure, the description has been made assuming, for example, that a display state change event is detected in operation 303, and an image based on the display state change event is displayed in operation 305, but the disclosure is not limited thereto, and the operations of 303 and 305 may be omitted. For example, the HMD device 100 may display an image in operation 301, and may perform an operation of checking the display state of the image in operation 306. For example, the HMD device 100 may check the display state of the image based on the image being displayed in the operation 301.

Further, according to an example of the disclosure, the operation of adjusting the display portion variance can be performed in a case where the display state of the image is applied with magnification or reduction magnification. When the display state of the image is not applied with the magnification or reduction magnification, the operation of adjusting the display portion variance may not be performed. On the other hand, when the display state of the image is equal to or smaller than the predetermined value that has already been configured, the operation of adjusting the display portion variance may not be executed. For example, when assuming the configured predetermined value as 1.5 times, if the display state of the image is 1.5 times or less, the HMD device 100 may display the image proportionally based on the configured display portion variance without performing the operation of adjusting the display portion variance. On the other hand, when the image magnification state is greater than 1.5 times, the HMD device 100 may perform the operation of adjusting the display portion variance. In this case, an image having the movement variance based on the movement applied thereto can be displayed. That is, the HMD 100 may display the image of which the display portion that has been moved based on the movement variance, when the initial configuration state (e.g., an image to which magnification or reduction magnification is not applied), of the display state is the configured predetermined value or less.

Figure 4:
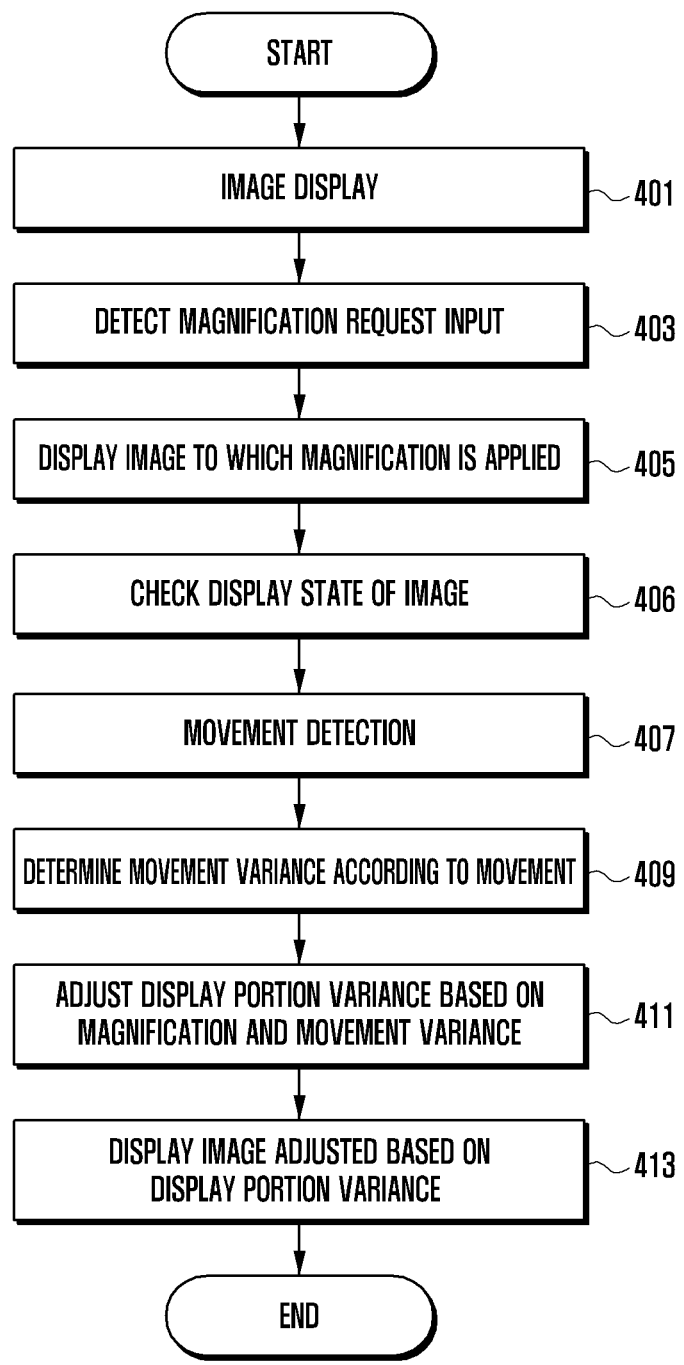
FIG. 4 is a flowchart illustrating an example method of controlling an image display based on a magnification input request and movement.

FIG. 4 is a flowchart illustrating an example method of controlling an image display based on a magnification input request and movement. FIGS. 5A-5D, 6A-6D, 7A-7D, 8A-8D and 9A-9D are diagrams illustrating an example method of controlling an image display based on a magnification input request and movement.

Referring to FIGS. 4 and 5A-5D, 6A-6D, 7A-7D, 8A-8D and 9A-9D, the HMD device 100 may display an image in operation 401. For example, the image may be in a state of maintaining the previous configuration state (e.g., a state of having magnification or reduction magnification applied) or an initial configuration state to which the magnification or reduction magnification is not applied. The HMD device 100 may detect the magnification request input through the input unit 120, in operation 403. For example, the HMD 100 may detect the magnification request input through a button input, voice input, and a motion input. When the magnification request input is detected, the HMD device 100 may display an image having the magnification applied thereto, in response to the magnification request input, in operation 405. For example, the user may request the magnification input request to see the displayed image in detail. At this time, the HMD device 100 may perform the operation of detecting a state of change in resolution of the image in response to the magnification request input. The HMD 100 may detect the state of change in resolution and display the state by applying the magnification associated therewith.

The HMD 100 may display the display portion in which some portions are enlarged based on the magnification, as shown, for example, in the following Table 1.

TABLE 1

| Operation (display portion) | Magnification ($\alpha < \beta$) |
|---|---|
| Operation 1 (Display portion A) | Initial configuration |
| Operation 2 (Display portion B) | $\times \alpha$ |
| Operation 3 (Display portion C) | $\times \beta$ |

According to an example of the disclosure, as shown in the Table 1 above, a magnification operation 1, a magnification operation 2, and a magnification operation 3 may, for example, be performed. The magnification operation 1 may display the display portion A as the initial configuration state. The magnification operation 2 can display the display portion B in a state where the magnification $\times \alpha$ is applied. The magnification operation 3 can display the display portion C in a state where the magnification $\times \beta$ is applied. The number of magnification operation may be changed based on the resolution of the image data or the mode configuration of the user.

Figure 5A:
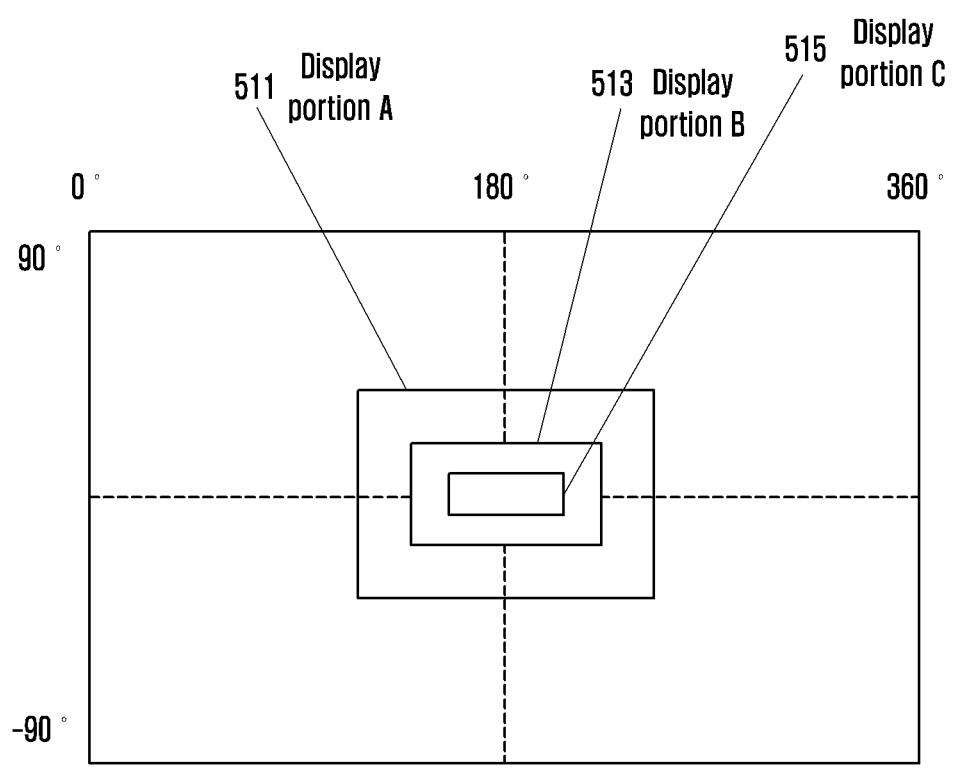
FIGS. 5A-5D, 6A-6D, 7A-7D, 8A-8D and 9A-9D are diagrams illustrating an example method of controlling an image display based on a magnification input request and movement.
Figure 5B:
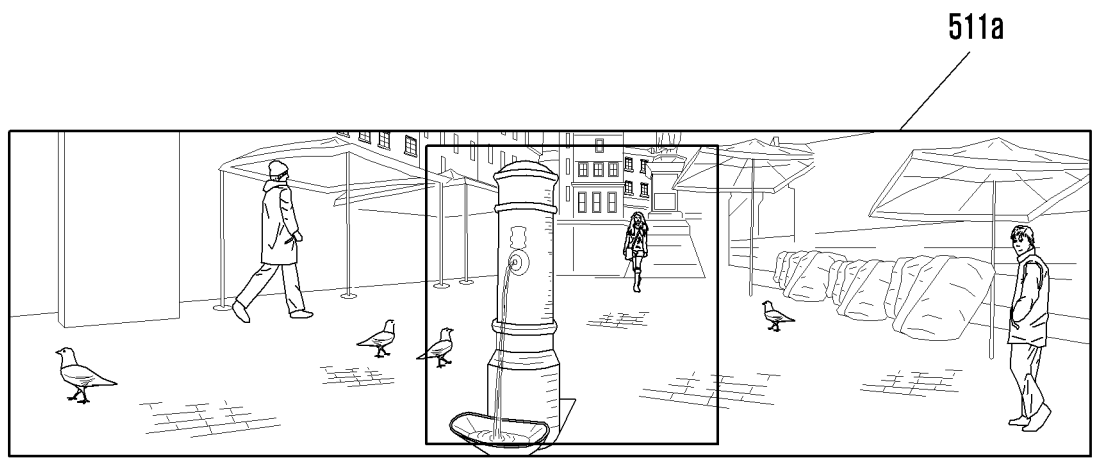
Figure 5C:
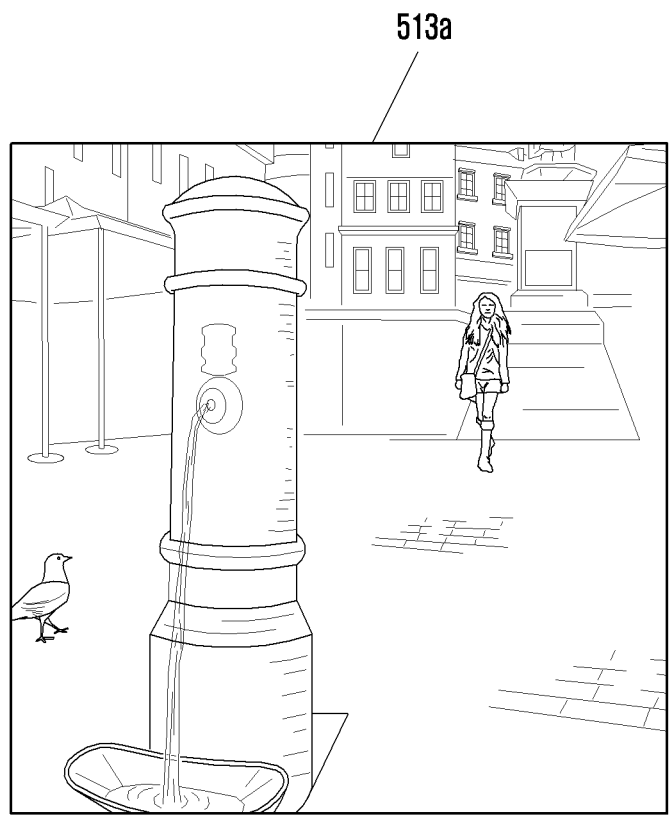
Figure 5D:

As illustrated in FIG. 5A to FIG. 5D, the HMD device 100 may, for example, display, in operation 401, the display portion A of the initial configuration state that corresponds to 511 of FIG. 5A, as indicated by 511a in FIG. 5B. When detecting the magnification request input by magnification $\times \alpha$, as indicated by 513 of FIG. 5A, in operation 403, the HMD 100 may display the display portion B to which the magnification $\times \alpha$ is applied, as indicated by 513a in FIG. 5C. On the other hand, when detecting the magnification request input by magnification $\times \beta$, as indicated by 515 of FIG. 5A, in operation 403, the HMD 100 may display the display portion C to which the magnification $\times \beta$ is applied, as indicated by 515a in FIG. 5D.

The HMD device 100 may check a display state of the image, in operation 406. For example, the HMD device 100 may check whether the image is in a magnification state or a reduction state. In addition, the HMD device 100 may check the rate information of the magnification state and the rate information of the reduction state. In addition, the HMD device 100 may check whether the display state of the image is equal to or smaller than the previously configured value.

The HMD device 100 may detect the movement of the HMD device 100 in operation 407. That is, the HMD device 100 may detect a motion in at least one direction of the up, down, left, and right directions. When the movement of the HMD device 100 is detected, the HMD device 100 may determine the movement variance according to the movement of the HMD device 100, in operation 409. That is, HMD device 100 may determine a movement amount along the X-axis and/or Y-axis.

For example, the HMD device 100 may perform operation 1. The operation 1 corresponds to the initial configuration state, and may be a state of detecting only movement without detecting a magnification or reduction input request. When detecting the movement only, a description will be given with reference to FIG. 6A to FIG. 6D.

Figure 6A:
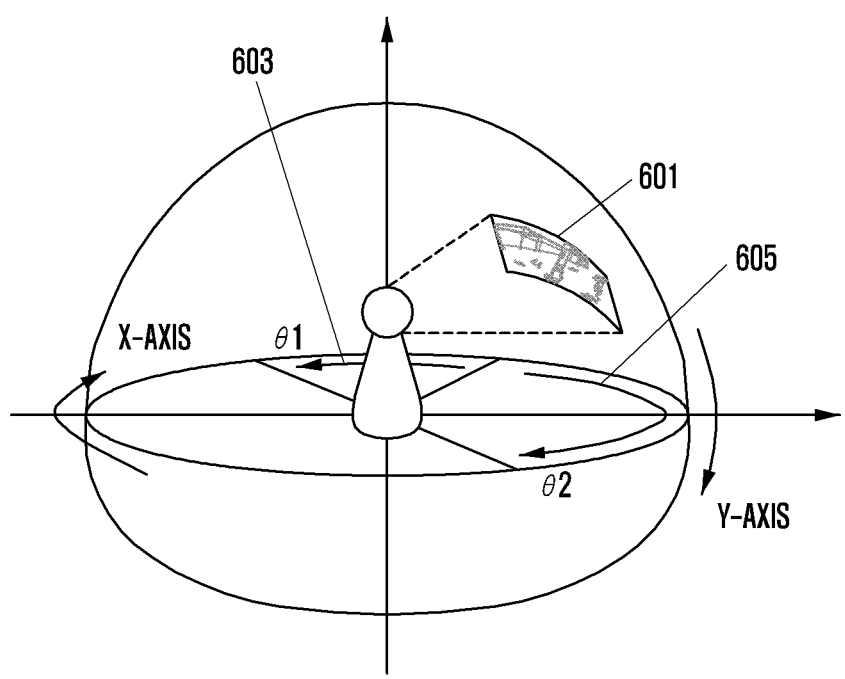
Figure 6B:
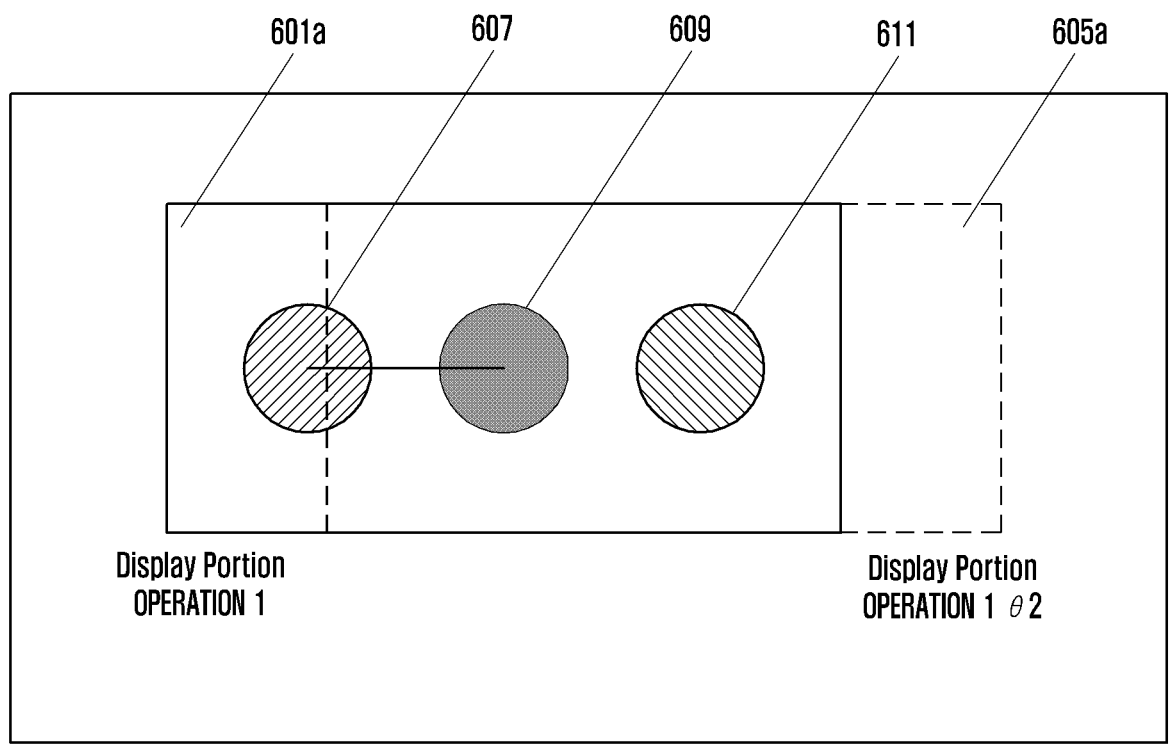

As illustrated in FIG. 6A, the HMD device 100 may detect the movement 603 by θ1 in the opposite direction along the X-axis in the initial configuration state 601, or may detect the movement 605 by θ2 along the X-axis direction. The HMD device 100 may set the initial configuration state 601 as a display portion operation 1 as indicated by 601a in FIG. 6B. In addition, when detecting the movement by θ2 along the X-axis direction, the HMD device 100 may display the display portion operation 1 θ2 605a corresponding thereto.

Figure 6C:
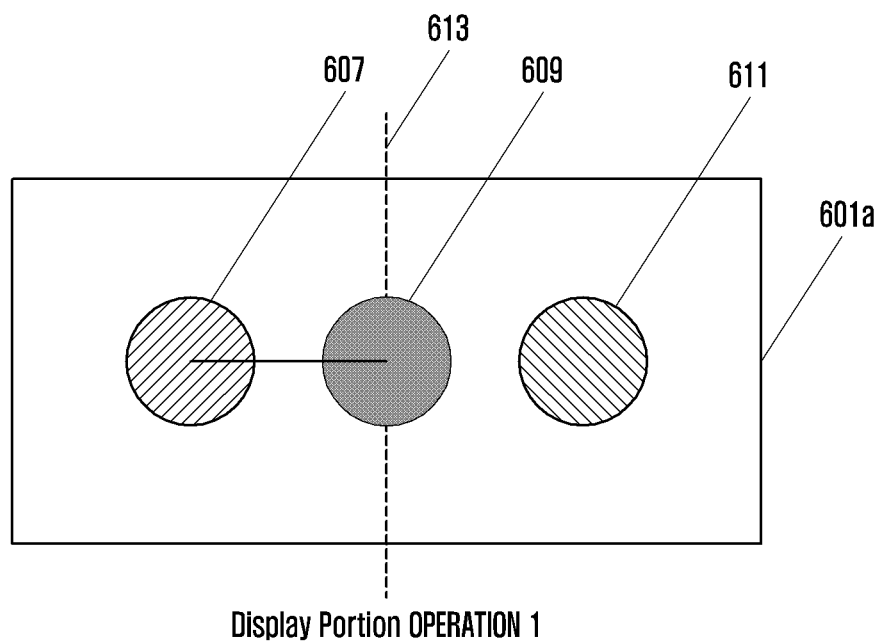
Figure 6D:
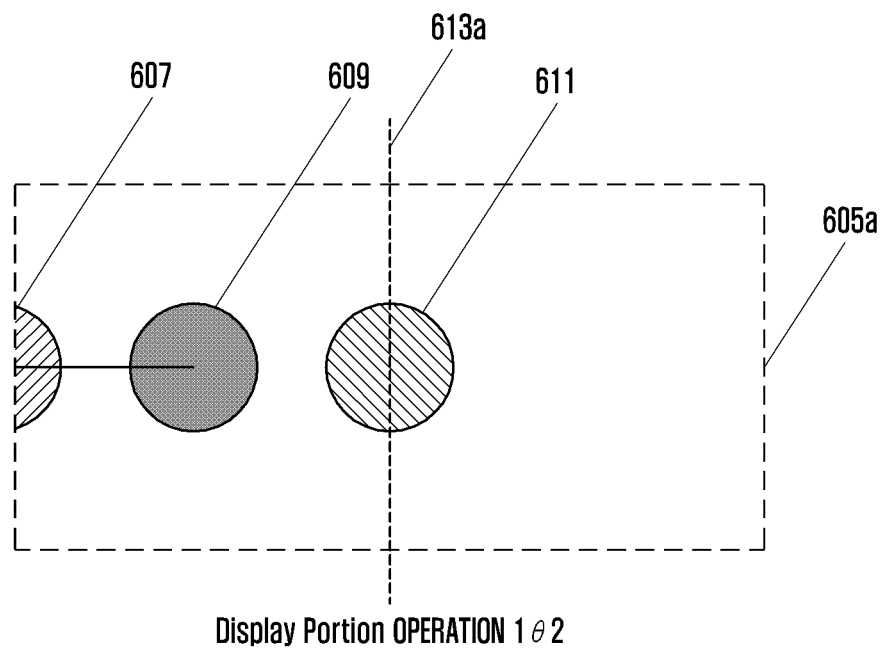

Referring to FIG. 6C, the display portion operation 1 601a of the initial configuration state will be described, and the display portion operation 1θ2 605A will be described with reference to FIG. 6D. As illustrated in FIG. 6C, the display portion 601a of the operation 1 of the initial configuration state may include a circle 607 hatched from the right to the lower left, a gray circle 609, and a circle 611 hatched from the left to the lower right. In addition, it may be a state where the gray circle 609 is located in the central region 613. When the HMD 100 detects the movement along the X-axis direction by θ2 in a state of displaying the display portion 601a of the operation 1, the central region 613a can be moved to a circle 611 hatched from left to lower right as shown in 605a in FIG. 6D. The image being displayed in the operation 1 can be displayed small as the initial configuration state where the image is not enlarged. Thus, even when detecting the movement of the HMD device 100, the variance of an image to be displayed is small. Since the variance of the image is small, the HMD device 100 may not perform the operation of adjusting the display portion variance.

In addition, the display portion 601a of the operation 1 and the display portion θ2 605a of operation 1 may be in the state of sharing large parts with each other. That is, the 601a and 605a may be in the state of sharing a part of a circle 607 hatched from right to lower left, a gray circle 609, and a circle 611 hatched from left to lower right. Thus, when portions overlapping on the display unit 140, as the 601a and 605a, are present, it can be determined that the image has continuity or directional nature.

According to an example of the disclosure, operation 2 can be performed in the initial configuration state of the HMD device 100. The operation 2 can be a state where the magnification ×α is applied. When detecting the movement in the state where the magnification ×α is applied, a description will be given with reference to FIG. 7A to FIG. 7D.

Figure 7A:
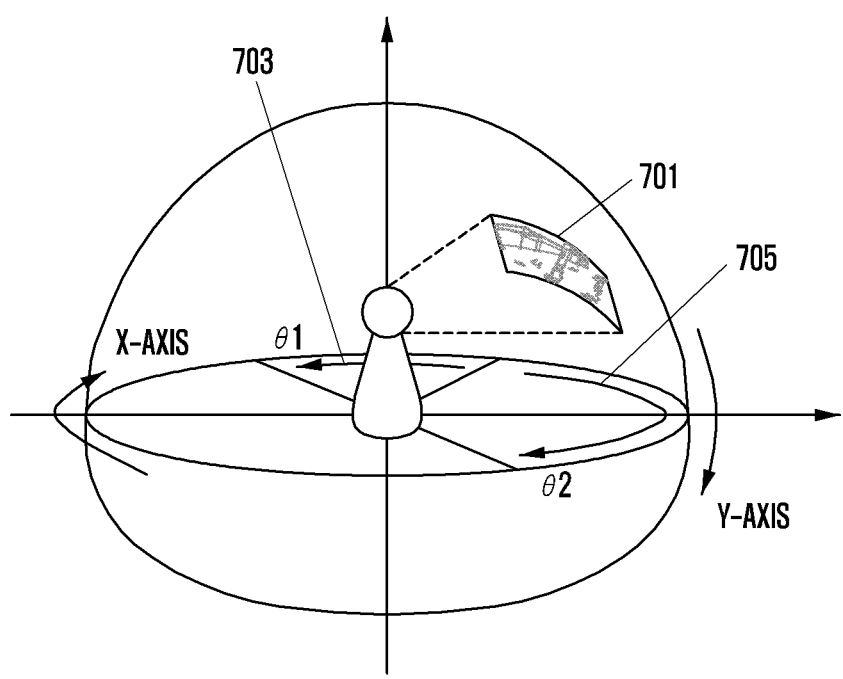
Figure 7B:
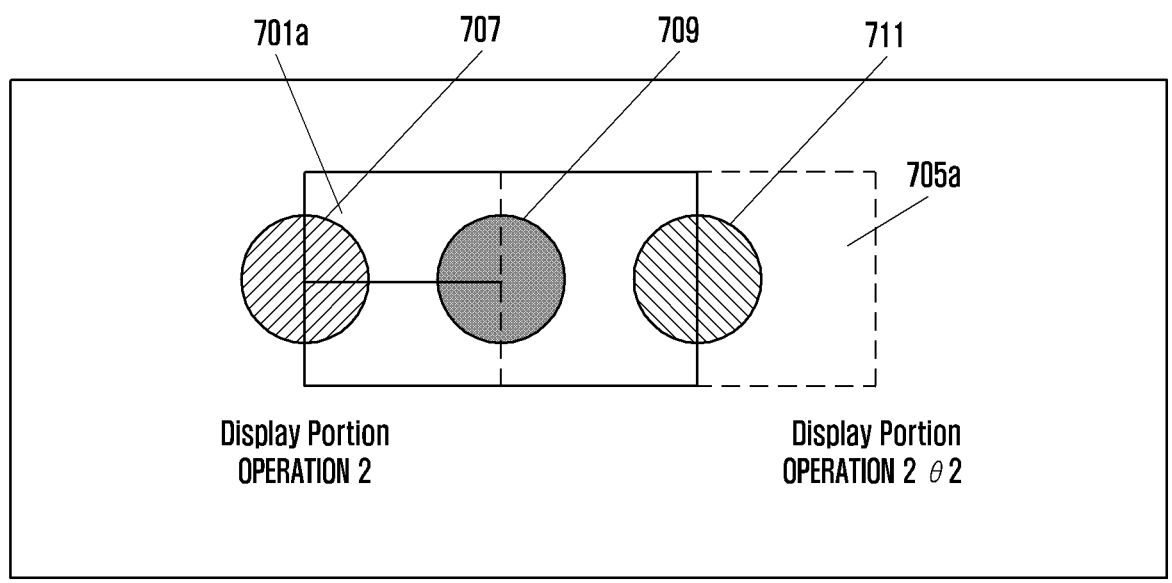

In a state 701 where a magnification ×α is applied in FIG. 7A, the HMD device 100 may detect a movement by θ1 703 opposite to the X-axis and a movement by θ2 705 along the X-axis direction. The HMD device 100 may set the initial configuration state 701 of the operation 2 as the display portion of the operation 2, indicated by 701a, in FIG. 7B. Here, the initial configuration state of the operation 2 may be a state where the magnification ×α is applied and has not detected the movement. When detecting a movement by θ2 along the X-axis direction, the HMD device 100 may display the display portion θ2 705a of the operation 2, corresponding thereto. The HMD device 100 may detect the movement by θ2 in the same direction and same speed as the operation 1. That is, the HMD device 100, as illustrated in FIG. 7B, in a state of displaying the image 701a having the magnification ×α applied thereto, when detecting a movement along the X-axis direction by θ2, may display the display portion θ2 705a of the operation 2 having the movement by θ2.

Figure 7C:
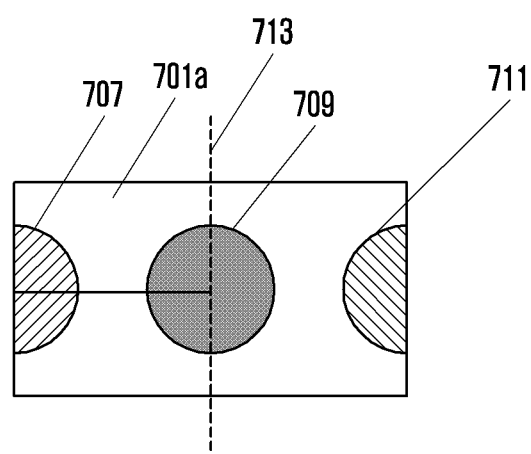
Figure 7D:
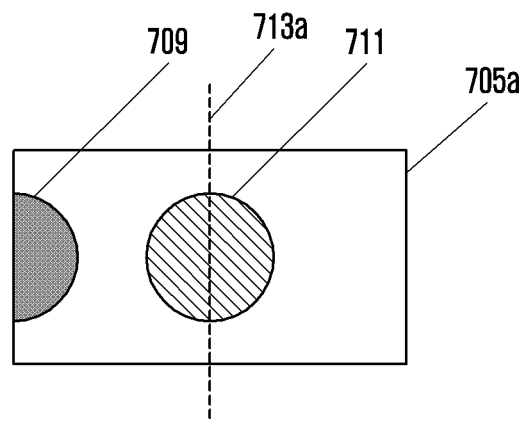

Referring to FIG. 7C, the display portion operation 701a of the operation 2 will be described, and the display portion θ2 705a will be described with reference to FIG. 7D. FIG. 7C illustrates a state of displaying a part of a circle 707 hatched from right to lower left, a gray circle 709, and a part of a circle 711 hatched from left to lower right, the center 713 of the user's field of view may be located at the gray circle 709. By detecting the movement by θ2 along the X-axis direction, the user's field of view may be shifted from the center 713 of the gray circle 709, as indicated by 713a in FIG. 7D, to the center 713a of the circle 711 hatched from left to lower right. The extent that is shared in the display portion 701a of the operation 2 in FIG. 7C and the display portion θ2 705a in FIG. 7D can be lower than that in the operation 1. For example, the display portion 701a of the operation 2 and the display portion θ2 705a of the operation 2 may be in the state of sharing less than that in the operation 1. For example, the operation 1 may be in the state of sharing a part of 607, 609, and 611, however the operation 2 may be in the state of sharing a part of 709 and 711 only.

The image having the operation 2 applied thereto, for example, the magnification ×α applied thereto and then displayed, may be larger compared to the image having the operation 1 applied thereto. Accordingly, as the variance in the displayed image increases, the user may quickly recognize the output variance of the image compared to the operation 1. That is, the image from the operation 2 having the magnification applied thereto may be displayed larger than the image from the operation 1 that is not applied with the magnification, and thus the variance of the image to be moved can be also large.

According to an example of the disclosure, the HMD device 100 may perform operation 3 on a display portion in the initial configuration state. The operation 3 will be described with respect to a state where the magnification ×β is applied. When detecting the movement in a state where the magnification ×β is applied, a description will be given with reference to FIG. 8A to FIG. 8D.

Figure 8A:
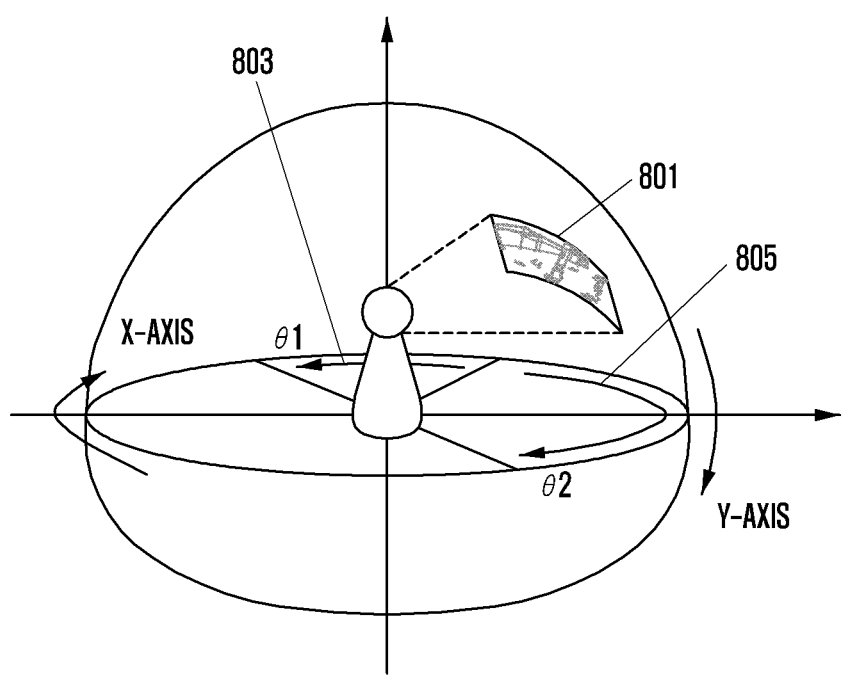
Figure 8B:
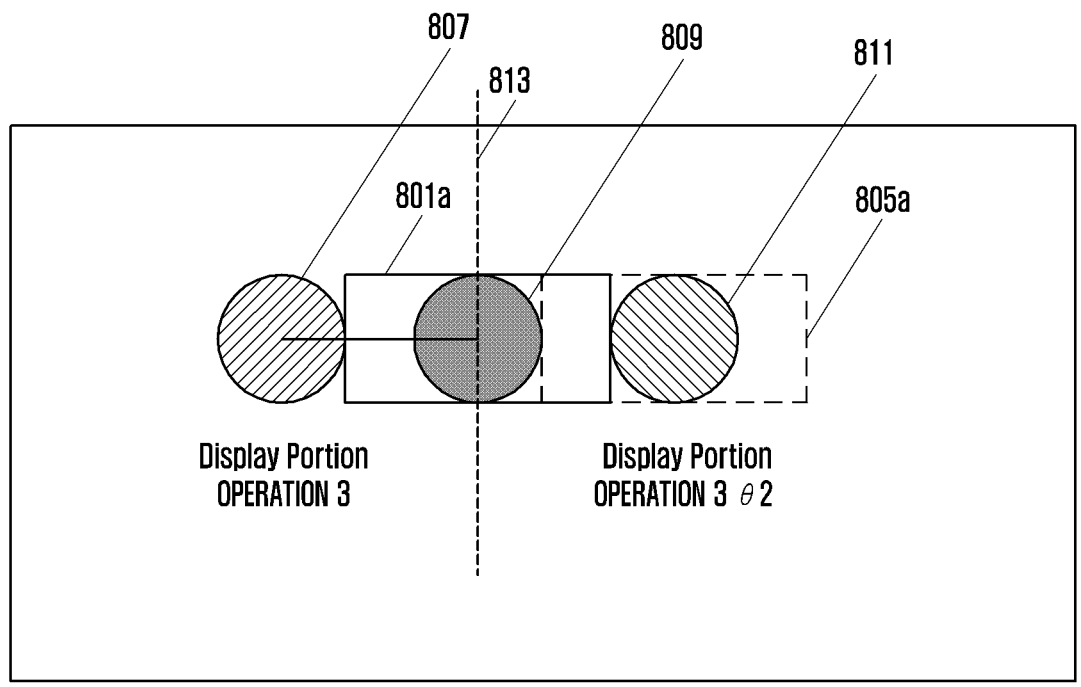

In a state 801 where a magnification ×β is applied, the HMD device 100 may detect a movement by θ1 803 in the opposite direction on the X-axis and a movement by θ2 805 along the X-axis direction. The HMD device 100 may set the initial configuration state 801 of the operation 3 as the display portion of the operation 3, indicated by 801a, in FIG. 8B. Here, the initial configuration state of the operation 3 may be a state where the magnification ×β is applied and the movement is not detected. When detecting a movement by θ2 along the X-axis direction, the HMD device 100 may display the display portion θ2 of the operation 3, corresponding thereto. The HMD device 100 may detect the movement by θ2 in the same direction and same speed as the operation 1. That is, the HMD device 100, as illustrated in FIG. 8B, in a state of displaying the display portion 801a having the magnification ×β applied thereto, when detecting a movement by θ2 along the X-axis direction, may display the display portion θ2 805a of the operation 3 having the movement by θ2.

Figure 8C:
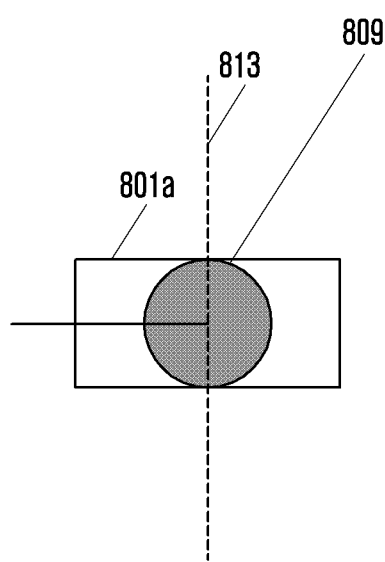
Figure 8D:
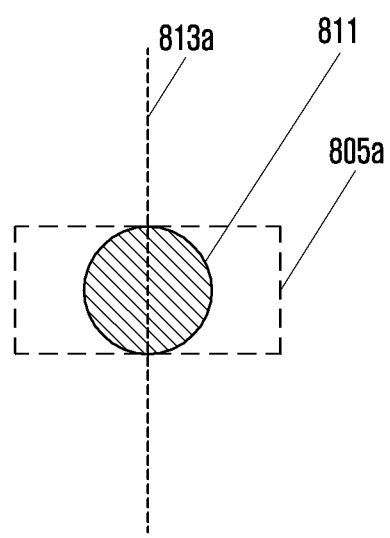

Referring to FIG. 8C, the display portion 801a of the operation 3 will be described, and the display portion θ2 805a will be described with reference to FIG. 8D. The movement that is moved by θ2 along the X-axis direction may mean that the user's field of view is shifted from the center of the gray circle 809 in FIG. 8C to the center 813a of the circle 811 hatched from left to lower right in FIG. 8D. The image to be displayed in the operation 3 can be displayed large compared to the operations 1 and 2.

For operation 3, as the variance in the displayed image increases, the user may quickly recognize the output variance of the image compared to the operations 1 and 2. In other words, in the image displayed by operation 3 when the state of the HMD device 100 is the state where the magnification ×β is applied, the variance of the image can be larger than the image in the initial configuration state and the image having the magnification ×α applied thereto. Thus, it is possible to identify that the sharing degree of the display portion 801a and the display portion θ2 805a of the operation 3 is lower than that of the operation 1 and operation 2. For example, the operation 1 and operation 2 may be in the state of sharing some circles, but a shared circle may not exist in the operation 3, as shown in FIG. 8C and FIG. 8D.

Returning to the description of FIG. 4, in operation 411, the HMD device 100 may adjust the display portion variance based on the display state of the image, that is, the magnification and the movement variance. The HMD device 100 may display the image where the display portion is adjusted according to the display portion variance, in operation 413.

Figure 9A:
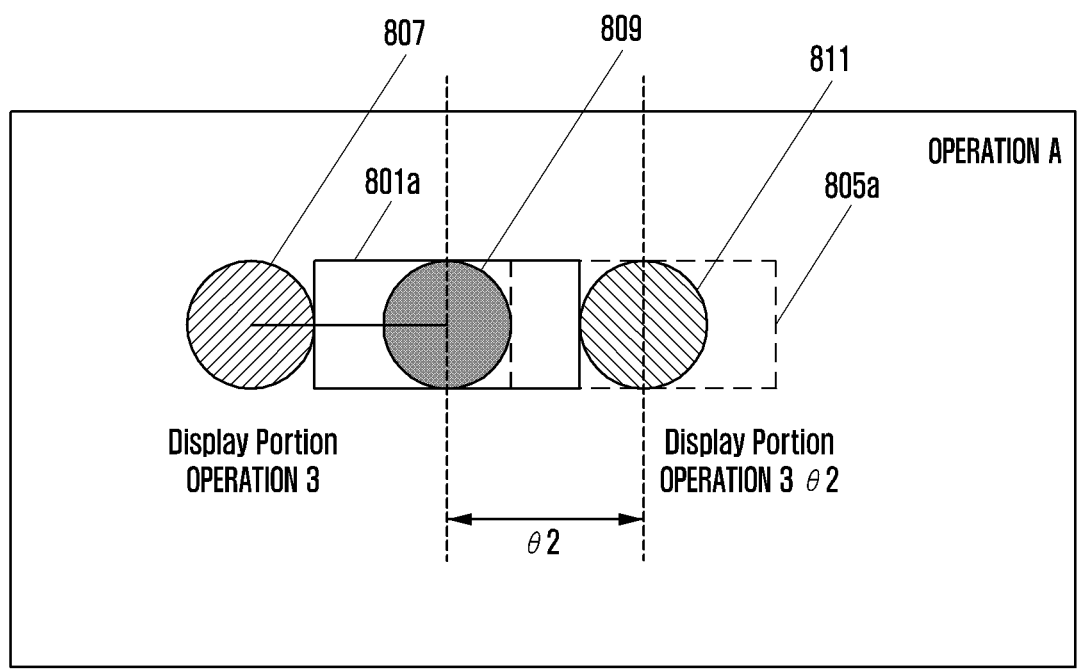

For example, as illustrated in FIG. 9A, the HMD device 100 may display an image having magnification ×β applied thereto, as indicated by 801a, in a state where the operation 3 is performed. The HMD device 100 may detect the movement along the X-axis direction by θ2. The HMD device 100 may be moved to correspond to the movement and display, on the display unit 140, the display portion θ2 805a of the operation 3. This state is assumed, for ease of explanation, as an operation A and will be described. For the operation A, since the variance of the image being displayed is large, it is difficult to understand the continuity of the image. Thus, when detecting the movement by θ2, the HMD device 100 may adjust the display portion variance so as to display the display portion which is moved smaller than the θ2.

Figure 9B:
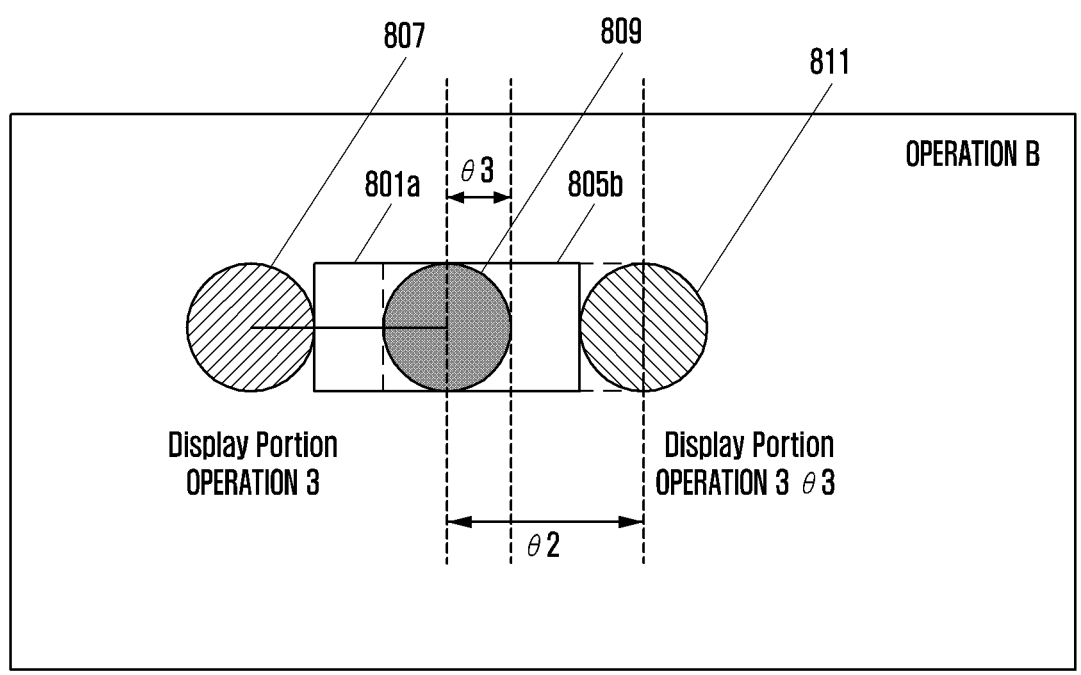

According to an example of the disclosure, as illustrated in FIG. 9B, the HMD device 100 may detect the movement and display the movement after adjusting the display portion variance with the variance smaller than the detected θ2 value. The HMD device 100 may detect the movement, and when the user's field of view is changed by θ2, the HMD device 100 may set the display portion variance corresponding thereto to θ3. This state is assumed, for ease of explanation, as an operation B and will be described. Here, the θ3 may have a value smaller than θ2. When the magnification ×β of the operation 3 is applied in the operation B state (FIG. 9B), it is possible to determine the value of θ3 based on Equation 2 below.

$$\theta 3 = \frac{\theta 2}{\beta}$$ [Equation 2]

(θ3: Display portion variance,

θ2: Movement variance, β: Magnification rate)

However, it is not limited thereto, and there are various equations that may be implemented to determine the θ3.

In Table 2, there is illustrated a display portion variance based on the magnification and movement variance.

TABLE 2

| Operation | Magnification rate(α < β) | Movement variance | Display portion variance |
|---|---|---|---|
| Operation 1 | Intial configuration | θ2 | θ3 = θ2 |
| Operation 2 | ×α | θ2 | θ3 = θ2/α |
| Operation 3 | ×β | θ2 | θ3 = θ2/β |

As illustrated in Table 2, it is possible to adjust the display portion variance on the basis of the magnification and the movement variance, and display the display portion that is moved smaller than the movement variance.

According to an example of the disclosure, it has been described assuming detecting of the magnification request input, which corresponds to the operation 403, and displaying of the image having the magnification applied thereto, which corresponds to the operation 405, but it is not limited thereto, and the operations of 403 and 403 can be omitted. For example, the HMD device 100 may display the image in operation 401, and may perform an operation of checking the display state of the image in operation 406. That is, the HMD device 100 may check the display state of the image based on the image being displayed in the operation 301.

Figure 9C:
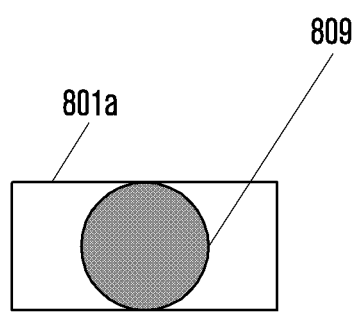
Figure 9D:
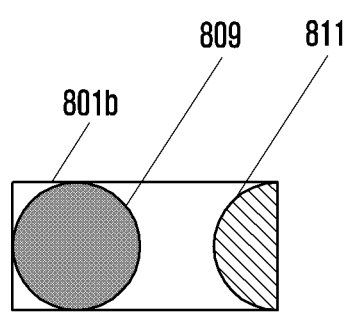

The HMD device 100 may display the display portion θ3 of the operation 3 by adjusting the θ3 value by Table 2 above, as indicated by 805b in FIG. 9B, instead of displaying the display portion θ2 805a of the operation 3 after the movement by θ2, as illustrated in FIG. 9C and FIG. 9D. That is, the HMD device 100 may display a state of sharing the gray circle 809 by adjusting the value of θ3. According to an example, the HMD device 100 may share a part of the image by adjusting the θ3 value, and enable the shared state to be appropriately maintained even in the magnified state. For example, the HMD device 100 may appropriately maintain the shared state even in the magnified state so as to close to the ratio of the degree of sharing a part of the image in the initial state or the previous configuration state. As a result, the image can be seen by the users without inducing dizziness.

Figure 10:
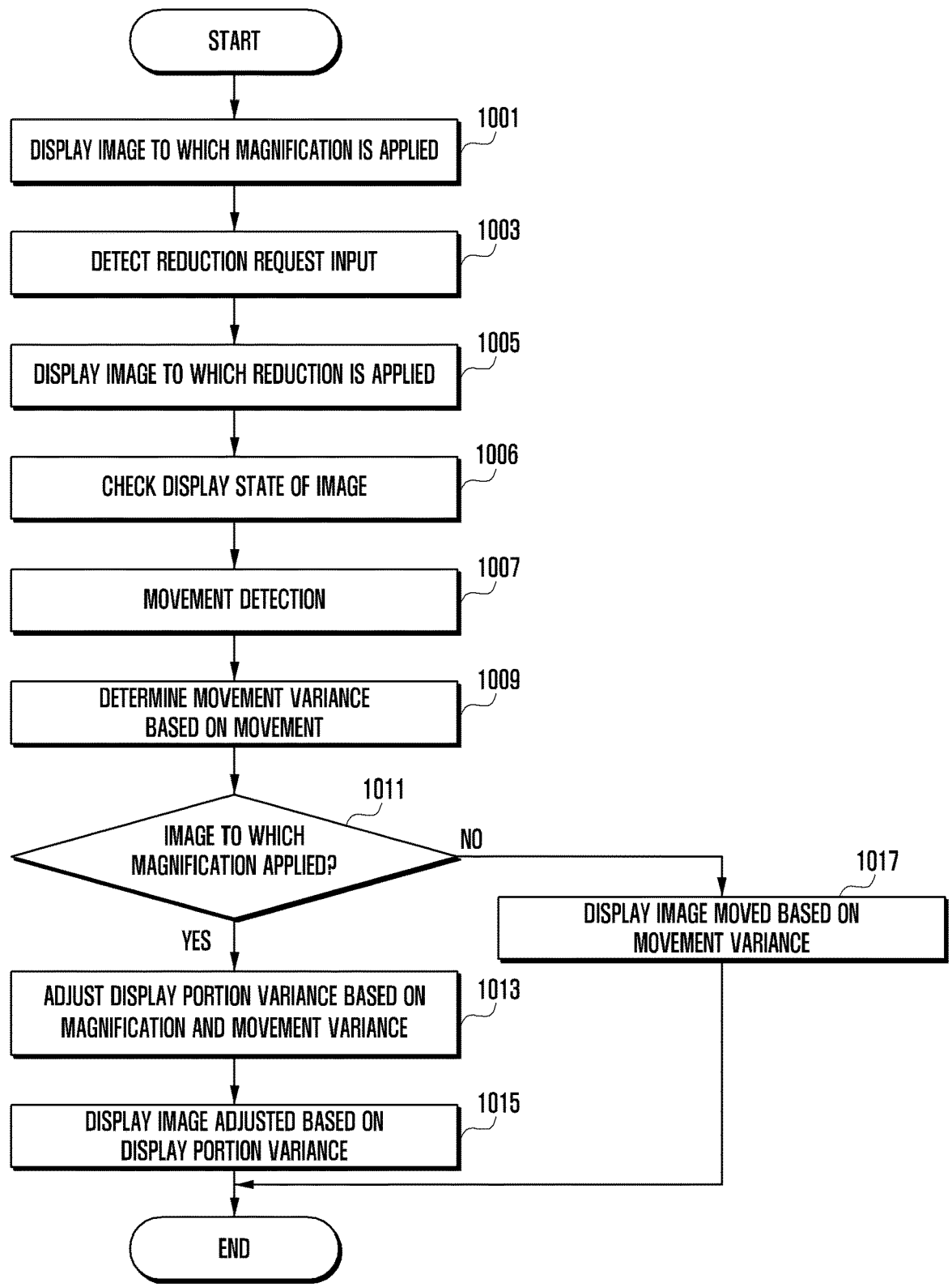
FIG. 10 is a flowchart illustrating an example method of controlling an image display based on a reduction input request and movement.
Figure 11A:
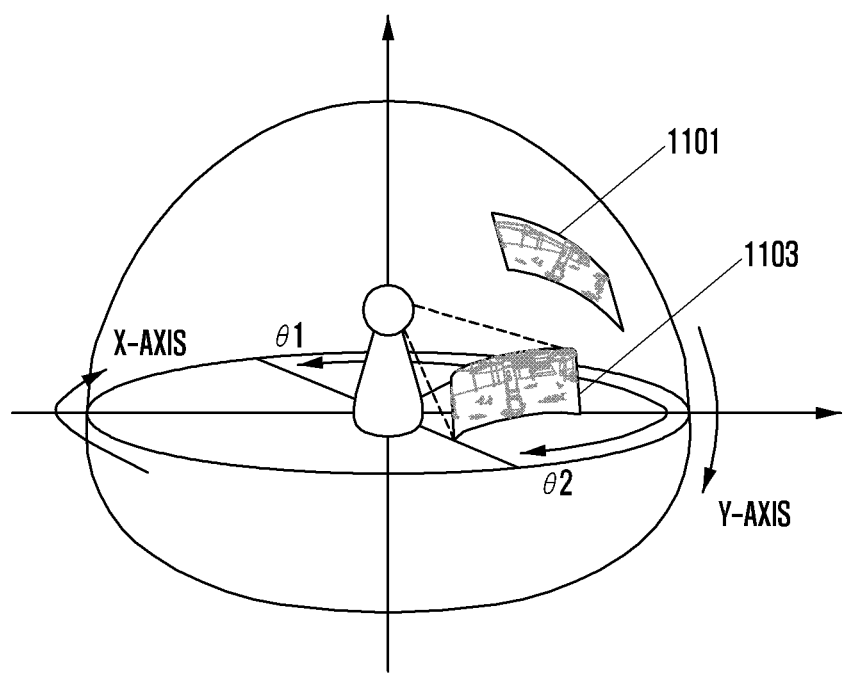
FIGS. 11A and 11B are diagrams illustrating an example method of controlling an image display based on a reduction input request and movement.
Figure 11B:
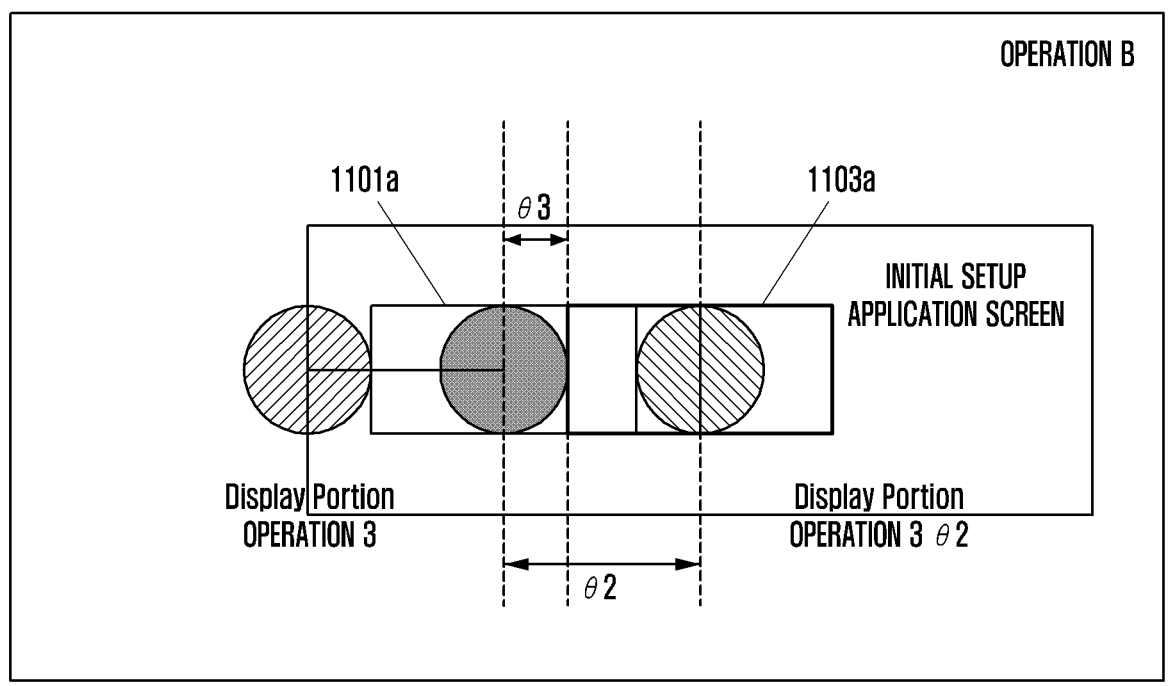

FIG. 10 is a flowchart illustrating an example method of controlling an image display based on a reduction input request and movement. FIGS. 11A and 11B are diagrams illustrating an example method of controlling an image display based on a reduction input request and movement.

According to an example of the disclosure, when detecting a movement from the image having a reduction rate applied thereto, the HMD device 100 may check whether to adjust the display portion variance. When the image having the reduction rate applied thereto corresponds to the magnified state, if the movement is detected, the HMD device 100 may display the image by adjusting the display portion variance. When the image having the reduction rate applied thereto does not correspond to the magnified state or the display state of the image is smaller than or equal to the pre-configured value, if the movement is detected, the HMD device 100 may apply the initial configuration state. The initial configuration state may be a state of displaying an image which has been changed in proportion to the movement that is detected through the sensor unit 150. That is, according to various examples of the disclosure, when the image having the reduction rate applied thereto does not correspond to the magnified state or the display state of the image is smaller than or equal to the pre-configured value, the HMD device 100 may display the image where the display portion has been changed based on the movement variance. When applying the initial configuration state, the HMD device 100 may perform an operation of correcting the display portion to be displayed based on the user's field of view information of the HMD device 100. Referring to FIG. 10, FIG. 11A and FIG. 11B, the HMD device 100 may display an image in operation 1001. Here, the image may be an image to which magnification is applied. For example, the image may be 513a in FIG. 5C (that is, the image to which magnification ×α is applied) or 515a in FIG. 5D (that is, the image to which magnification ×β is applied). The HMD device 100 may detect a reduction request input in operation 1003. When the reduction request input is detected, the HMD device 100 may display the image to which the reduction rate is applied, in operation 1005. For example, when detecting the reduction request input in the image to which the magnification ×β is applied, the HMD device 100 may display the image to which a reduction rate 1/β is applied. Here, the image display state magnification can be configured as a value smaller than or equal to ×β. In addition, when detecting the reduction request input in the image to which the magnification ×α is applied, the HMD device 100 may display the image to which a reduction rate 1/α is applied. Here, the image display state magnification can be configured as a value smaller than or equal to ×α.

The HMD device 100 may check a display state of the image in operation 1006. For example, when the display state of the image is applied with ×α, it is possible to identify an initially configured image in accordance with the reduction rate. The operation can be performed based on the movement variance which will be described later. The HMD device 100 may detect the movement of the HMD device 100 through the sensor unit 150, in operation 1007. When the movement of the HMD device 100 is detected, the HMD device 100 may determine the movement variance based on the movement, in operation 1009. In addition, the HMD device 100, in the operation of 1011, may determine whether the display state of the image is the image to which magnification is applied, or the display state is smaller than or equal to a pre-configured value. For example, the HMD device 100 may determine whether the image to which a reduction rate is applied corresponds to the image which has been applied with a magnification rate, in the operation 1005. If the image corresponds to the image to which magnification rate is applied, the HMD device 100 may analyze the magnification rate and adjust the display portion variance based on the magnification rate and the movement variance in operation 1013. The HMD device 100 may display the image that is adjusted according to the display portion variance, in operation 1015.

For example, as illustrated in FIG. 11A, when the movement by θ2 from the user's field of view 1101 which the user is viewing is detected, the user's field of view is changed to 1103. In addition, as illustrated in FIG. 11B, when the movement is detected in the state of displaying an image 1101a to which a magnification rate is applied, the HMD device 100 may detect a state 1103a where the viewpoint corresponding to the actual movement is shifted along the X-axis direction by θ2. At this time, the HMD device 100 may adjust the display portion variance by θ3 and display the result on the display unit 140. When detecting the reduction request input in the state where the magnification is applied and the viewpoint has been moved by θ3, the HMD device 100 may apply the display portion 1103a with the initial setup screen based on the changed value θ2. For example, the initial setup screen can be applied based on the field of view 1103a based on the actual movement, rather than the information on the field of view being displayed (that is, moved by θ3). This is because the actual field of view determined by the movement of the HMD device 100 and the field of view of the image being displayed can be displaced.

If the display state of the image is smaller than or equal to the pre-configured value, which is determined as the initial configuration state (that is, the image to which magnification or reduction rate is not applied), the HMD device 100 may display, in operation 1017, the image where the display portion is moved based on the movement variance determined by the operation 1009.

Although the method and the apparatus for changing of the network menu of the electronic device according to the examples of the disclosure have been described through the specification and drawings by using the specific terms, the examples and the terms are merely used as general meanings to easily describe technical contents of the disclosure and to aid in understanding of the disclosure, and the disclosure is not limited to the examples. For example, it is obvious to those skilled in the art to which the disclosure belongs that various examples can be implemented based on the technical idea of the disclosure.

What is claimed is:

1. A method of controlling an image display of an electronic device, the method comprising:
   displaying an image which is magnified in response to a user request;
   when a movement of the electronic device is detected, determining a movement amount for changing a display portion of the magnified image in a virtual space, based at least on a degree of magnification of the magnified image and a movement variance of the electronic device corresponding to the movement; and
   displaying a portion of the image which has been changed based on the determined movement amount,
   wherein the movement amount for changing the display portion of the magnified image is inversely proportional to the degree of magnification of the magnified image, and
   wherein the determining the movement amount comprises determining whether to adjust the display movement variance based on the degree of magnification of the magnified image, such that the display movement variance is adjusted based on magnification of the magnified image when the degree of magnification is greater than a predetermined value, and the display movement variance is not adjusted based on magnification of the magnified image when the degree of magnification of the magnified image is less than the predetermined value.

2. The method of claim 1, wherein the portion of the image having the changed display portion includes at least a part of the image before the detecting the movement of the electronic device.

3. The method of claim 1, further comprising:
   detecting a display state change event; and
   displaying the image where a display state has been changed in response to the display state change event.

4. The method of claim 3, wherein the display state change event comprises at least one of: an input requesting enlargement of the image and an input requesting reduction of the image.

5. The method of claim 4, further comprising:
obtaining the movement amount corresponding to the movement variance if the magnification of the magnified image is equal to or less than a predetermined value; and
displaying the portion of the image which has been changed based on the obtained movement amount corresponding to the movement variance.

6. The method of claim 1, wherein the movement amount for changing the display portion of the magnified image decreases as the magnification of the magnified image increases.

7. The method of claim 4, wherein determining the movement amount for changing the display portion of the magnified image further comprises:
determining whether the image is in a state where an enlargement rate is applied; and
adjusting the movement amount based on the enlargement rate if the image is in the state where the enlargement rate is applied.

8. The method of claim 7, further comprising:
displaying a portion of the image changed based on the movement variance of the electronic device if the magnification of the magnified image is less than or equal to the predetermined value.

9. The method of claim 1, wherein the magnified image is in the state of at least one of: an initial display state or a previous display state.

10. The method of claim 1, further comprising:
determining whether a Head Mounted Display (HMD) device is worn if the electronic device comprises the HMD;
detecting a movement of the head of a user in at least one direction including up, down, left, and right directions; and
determining the movement amount based on the movement of the head of the user.

11. An electronic device comprising:
a display configured to display an image which is magnified and displayed in a virtual space;
a sensor configured to detect a movement of the electronic device;
a controller configured to determine a movement amount for changing a display portion of the magnified image, based at least on a degree of magnification of the magnified image and a movement variance of the electronic device corresponding to a movement of the electronic device when the movement of the electronic device is detected, and to control the display to display a portion of the image which has been changed based on the determined movement amount; and
wherein the controller is configured to determine whether to adjust the display movement variance based on the degree of magnification of the magnified image, such that the display movement variance is adjusted based on magnification of the magnified image when the degree of magnification is greater than a predetermined value, and the display movement variance is not adjusted based on magnification of the magnified image when the degree of magnification of the magnified image is less than the predetermined value;
wherein the movement amount for changing the display portion of the magnified image is inversely proportional to the degree of magnification of the magnified image.

12. The electronic device of claim 11, wherein the controller is configured to control the display to display an image having a changed display state in response to detection of the display state change event.

13. The electronic device of claim 12, further comprising input circuitry configured to detect the display state change event including at least one of: an input requesting enlargement of the image and an input requesting reduction of the image.

14. The electronic device of claim 11, wherein the controller is configured to obtain the movement amount corresponding to the movement variance if the magnification of the magnified image is equal to or less than a predetermined value, and to control the display to display the portion of the image which has been changed based on the obtained movement amount corresponding to the movement variance.

15. The electronic device of claim 14, wherein the controller is configured to obtain the movement amount differently based on the magnification of the image, and the movement amount for changing the display portion of the magnified image decreases as the magnification of the magnified image increases.

16. The electronic device of claim 13, wherein when detecting an input requesting the reduction of the image, the controller is configured to determine whether the image is in a state in which an enlargement rate is applied; and if the image is in the state in which the enlargement rate is applied, the controller is configured to adjust the movement amount based on the enlargement rate and the movement variance.

17. The electronic device of claim 16, wherein the controller is configured to control the display to display a portion of the image changed based on the movement variance of the electronic device if the magnification of the magnified image is equal to or less than the predetermined value.

18. The electronic device of claim 11, wherein the electronic device comprises to a Head Mounted Display (HMD) device, and wherein the controller is configured:
to determine whether the HMD device is worn; to detect movement of the head of a user in at least one direction including up, down, left, and right directions; and to determine the movement amount based on the movement of the head of the user.

* * * * *